(12) United States Patent
Cohen

(10) Patent No.: US 10,171,714 B2
(45) Date of Patent: Jan. 1, 2019

(54) SYSTEMS AND METHODS INVOLVING EDGE CAMERA ASSEMBLIES IN HANDHELD DEVICES

(71) Applicant: Smart Third-I LTD., Sderot (IL)

(72) Inventor: Amos Cohen, Even Yehuda (IL)

(73) Assignee: SMART THIRD-I LTD., Sderot (IL)

(*) Notice: Subject to any disclaimer, the term of this patent is extended or adjusted under 35 U.S.C. 154(b) by 0 days.

(21) Appl. No.: 15/836,287

(22) Filed: Dec. 8, 2017

(65) Prior Publication Data
US 2018/0124293 A1 May 3, 2018

Related U.S. Application Data

(63) Continuation of application No. PCT/IB2017/000629, filed on May 4, 2017, which is (Continued)

(51) Int. Cl.
*G06G 1/16* (2006.01)
*G06K 9/00* (2006.01)
(Continued)

(52) U.S. Cl.
CPC .......... *H04N 5/2252* (2013.01); *G06G 1/16* (2013.01); *G06K 9/00664* (2013.01); (Continued)

(58) Field of Classification Search
CPC .. H04N 5/2252; H04N 5/2253; H04N 5/2258; H04N 5/23293; H04N 5/44504; G06K 9/00664; H04M 1/0264
See application file for complete search history.

(56) References Cited

U.S. PATENT DOCUMENTS

| 2,010 A | * | 3/1841 | King ........................ B27F 5/02 144/75 |
| 9,451,062 B2 | | 9/2016 | Rodolico |

(Continued)

OTHER PUBLICATIONS

International Search Report from the U.S. Patent and Trademark Office for International Application No. PCT/IB2017/000629, dated Oct. 5, 2017.
Written Opinion of the International Searching Authority from the U.S. Patent and Trademark Office for International Application No. PCT/IB2017/000629, dated Oct. 5, 2017.

*Primary Examiner* — Amy R Hsu
(74) *Attorney, Agent, or Firm* — Finnegan, Henderson, Farabow, Garrett & Dunner, LLP

(57) ABSTRACT

Systems and methods are disclosed for capturing and displaying real-time images of the environment in front of a user. In one implementation, a casing for a mobile device having an upward facing display surface and an opposing lower surface is provided. The casing may include a housing and image sensor having at least one optical axis configured to be oriented at a fixed obtuse angle with respect to the lower surface when the mobile device is retained by the housing. The image sensor may be oriented such that when the housing is held by a walking user at an acute angle with respect to a plane on which the user walks, the at least one optical axis generally faces in a walking direction of the user. The casing may further include circuitry for conveying from the at least one image sensor, image data for real-time display on the display surface.

22 Claims, 30 Drawing Sheets

Related U.S. Application Data a continuation-in-part of application No. 15/220,418, filed on Jul. 27, 2016.

(60) Provisional application No. 62/333,197, filed on May 7, 2016, provisional application No. 62/425,741, filed on Nov. 23, 2016, provisional application No. 62/434,695, filed on Dec. 15, 2016.

(51) Int. Cl.
*H04M 1/02* (2006.01)
*H04N 7/18* (2006.01)
*H04N 5/225* (2006.01)
*H04N 5/232* (2006.01)
*H04N 5/445* (2011.01)
*G06F 3/0488* (2013.01)

(52) U.S. Cl.
CPC ........ *H04M 1/0264* (2013.01); *H04N 5/2253* (2013.01); *H04N 5/2257* (2013.01); *H04N 5/2258* (2013.01); *H04N 5/23293* (2013.01); *H04N 5/44504* (2013.01); *H04N 7/18* (2013.01); *H04N 7/183* (2013.01); *G06F 3/0488* (2013.01); *H04M 2250/22* (2013.01); *H04M 2250/52* (2013.01)

(56) References Cited

U.S. PATENT DOCUMENTS

| | | | |
|---|---|---|---|
| 2009/0161004 A1* | 6/2009 | Yuan | H04M 1/0264 348/369 |
| 2010/0137026 A1 | 6/2010 | Kim et al. | |
| 2012/0088555 A1* | 4/2012 | Hu | H04B 1/3883 455/573 |
| 2012/0163625 A1* | 6/2012 | Siotis | H04R 3/005 381/92 |
| 2012/0188391 A1* | 7/2012 | Smith | H04N 5/2258 348/222.1 |
| 2013/0150122 A1* | 6/2013 | Kulas | H04M 1/0264 455/556.1 |
| 2013/0231157 A1* | 9/2013 | Chung | H04M 1/0264 455/556.1 |
| 2014/0078275 A1* | 3/2014 | Joao | G08B 21/02 348/61 |
| 2014/0232633 A1* | 8/2014 | Shultz | H04M 1/72522 345/156 |
| 2014/0247346 A1* | 9/2014 | Bozarth | H04N 7/18 348/143 |
| 2015/0281530 A1* | 10/2015 | Kessler | G03B 17/565 348/373 |

* cited by examiner

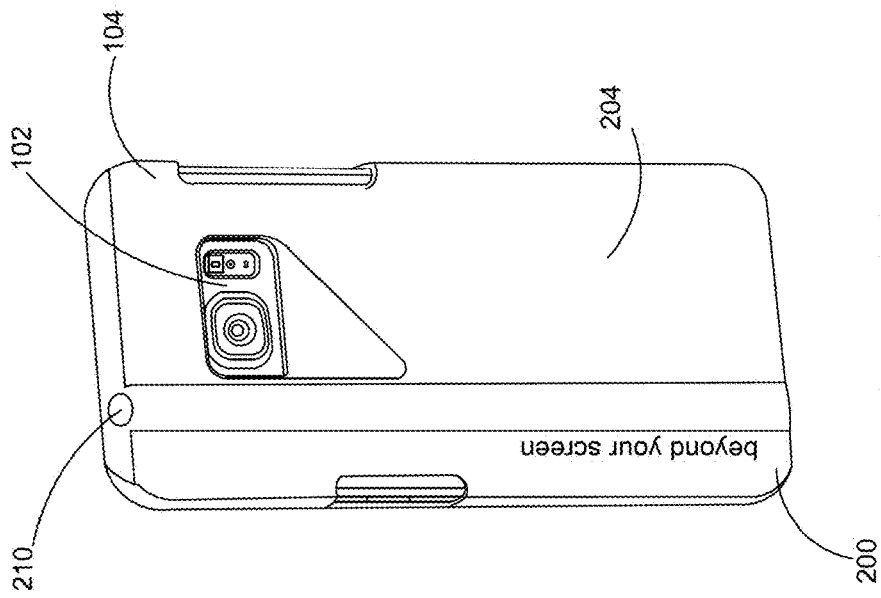
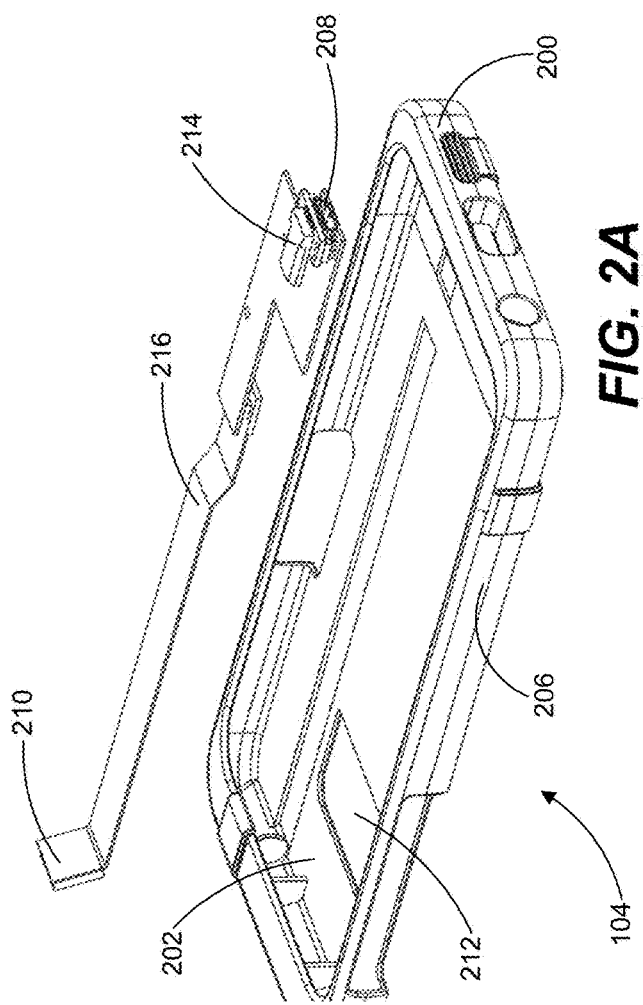
FIG. 2B
FIG. 2A

SYSTEMS AND METHODS INVOLVING EDGE CAMERA ASSEMBLIES IN HANDHELD DEVICES

CROSS REFERENCES TO RELATED APPLICATIONS

This application claims the benefit of priority of U.S. Provisional Patent Application No. 62/333,197, filed on May 7, 2016; U.S. patent application Ser. No. 15/220,418, filed on Jul. 27, 2016; U.S. Provisional Patent Application No. 62/425,741, filed on Nov. 23, 2016; and U.S. Provisional Patent Application No. 62/434,695, filed on Dec. 15, 2016. All of the foregoing applications are incorporated herein by reference in their entirety.

BACKGROUND

I. Technical Field

The present disclosure relates generally to image capturing in handheld mobile communications devices and, more specifically, to systems and methods for capturing and displaying real-time images of the environment in front of a user.

II. Background Information

Mobile communications devices are a prevalent part of modern daily life. Although originally conceived as a communications device to provide speech communication between people, mobile communications devices have become central to people's interactions, communications, and activities with each other and with online data services. It is a common situation that when a user's attention is directed toward the screen of the mobile communications device, the user is disengaged from the surrounding environment.

This situation has hazardous implications as many people use their mobile communications devices while doing other activities, such as walking on the street. For example, people walking down a street while typing a text onto the mobile communications device have been seen walking into lampposts, puddles, and even oncoming vehicular traffic. Due to the angle at which users usually look at mobile device screens, the users' peripheral vision cannot be relied on to pick out obstacles in their walking direction.

Moreover, personal mobile communications devices are being used today for generating augmented reality. In some cases, apps installed on mobile communications devices may use the devices' GPS and camera to superimpose content atop a user's real-time view of the environment. These apps can create a composite presentation rooted in both real and virtual worlds. One example is the "Pokémon Go" app, which became a global phenomenon and was one of the most used and profitable mobile apps in 2016. However, the current placement of cameras in mobile communications devices requires holding the mobile communications device vertically in order to capture the environment in front of the user. This posture is uncomfortable when being used for a long period of time and not suitable for use while walking.

The disclosed devices and methods are directed to provide a new way for image capturing, one that aligns with the natural holding angle of the mobile communications device and solves at least some of the problems outlined above.

SUMMARY

Embodiments consistent with the present disclosure provide devices and methods for image capturing in handheld mobile communications devices. In one embodiment an image capture casing for a handheld mobile communications device having an upward facing display surface and an opposing lower surface is provided. The image capture casing may include a housing for surrounding at least a portion of the handheld mobile communications device. The image capture casing may also include at least one image sensor mounted in the housing and having at least one optical axis configured to be oriented at a fixed obtuse angle with respect to the lower surface when the handheld mobile communications device is retained by the housing, wherein the at least one image sensor is oriented such that when the housing is held by a walking user at an acute angle with respect to a plane on which the user walks, the at least one optical axis generally faces in a walking direction of the user. The image capture casing may further include circuitry for conveying from the at least one image sensor, image data for real-time display on the display surface.

In accordance with another disclosed embodiment, a handheld mobile communications device is provided. The handheld mobile communications device may include, a casing, an upward facing display surface on a first side of the casing, and a lower surface opposing the display surface on a second opposing side of the casing. The handheld mobile communications device may also include at least one image sensor mounted in the casing and having at least one optical axis configured to be oriented at a fixed obtuse angle with respect to the lower surface, wherein the at least one image sensor is oriented such that when the casing is held by a walking user at an acute angle with respect to a plane on which the user walks, the at least one optical axis generally faces in a walking direction of the user. The handheld mobile communications device may further include circuitry for conveying from the at least one image sensor, image data for real-time display on the display surface.

In accordance with another disclosed embodiment, a removable case for a handheld mobile communications device having an upward facing display surface and an opposing lower surface is provided. The case may include a housing for surrounding at least a portion of the handheld mobile communications device. The case may also include a connector for making electrical connection with a port in the handheld mobile communications device when the handheld mobile communications device is seated in the housing. In addition, the case may also at least one image sensor mounted in the housing and having at least one optical axis configured to be oriented at a fixed obtuse angle with respect to the lower surface when the handheld mobile communications device is retained by the housing, wherein the at least one image sensor is oriented such that when the housing is held by a walking user at an acute angle with respect to a plane on which the user walks, the at least one optical axis generally faces in a walking direction of the user. The case may further include circuitry for conveying from the at least one image sensor, image data for real-time display on the display surface.

In accordance with another disclosed embodiment, a mobile device for presenting a real-time view of an environment in front of a user while the user interacts with displayed information is provided. The mobile device may include a housing generally having a central axial plane, a touch-sensitive display on a first side of the housing, a back on a second side of the housing, opposite the first side, and a peripheral edge surface between the first side and the second side. The mobile device may also include at least one image sensor fixedly secured within the housing and having a fixed optical axis at a non-orthogonal angle relative to each of the first side of the housing, the second side of the housing, and the central axial plane.

In accordance with another disclosed embodiment, a removable case for a mobile device having a touch-sensitive display is provided. The case may include a housing for surrounding at least a portion of the mobile device, the housing having a first side, a second side opposite the first side, a peripheral edge surface interconnect the first side and the second side and having a generally central axial plane. The case may also include a connector for making electrical contact with a port in the mobile device when the mobile device is seated in the housing. The case may also include at least one image sensor fixedly secured within the housing and having a fixed optical axis at a non-orthogonal angle relative to each of the first side of the housing, the second side of the housing, and the central axial plane. The case may further include circuitry for conveying from the at least one image sensor, image data for real-time display on the touch-sensitive display surface.

In accordance with another disclosed embodiment, a handheld communications device configured to provide augmented reality to a user looking downward while traversing a forward path of travel is provided. The handheld communications device may include a housing having a upper surface, a lower surface, and a side edge, a touch-sensitive display located in the upper surface, and at least one processor. The handheld communications device may also include an image sensor fixedly embedded in the housing at an orientation such that when the handheld communications device is held in a hand of a user with the touch-sensitive display opposed to a face of the downward looking user, an optical axis of the image sensor extends generally in a direction of the path of travel. The at least one processor may be programmed to acquire an image stream from the image sensor; identify in the acquired image stream an object in the path of travel of the user; look-up information about the identified object; present, on the touch-sensitive display in real-time the acquired image stream including the identified object; and present on the touch-sensitive display a visual indicator associated with the identified object.

In accordance with another disclosed embodiment, a removable case for a handheld communications device including a touch-sensitive display is provided. The case may include a housing having a lower surface, an upper surface, and an edge therebetween. The case may also include at least one image sensor embedded in the housing at an orientation such that when the handheld communications device is seated in the case and held in a hand of a downward looking user with the touch-sensitive display opposed to a face of the downward looking user, an optical axis of the at least one image sensor extends generally in a direction of the path of travel. The case may further include a connector in the housing configured to engage a port of the handheld communications device when the handheld communications device is seated in the case, and at least one conduit embedded in the case extending between and electrically connecting the at least one image sensor with the connector to thereby enable real-time image streaming from the at least one image sensor to the handheld communications device. In addition, case may include at least one processor for overlaying a visual indicator on the real-time image stream.

In accordance with another disclosed embodiment, a method for providing augmented reality to a user traversing a forward path of travel while looking downward at a touch-sensitive display of a handheld communications device is provided. The method may include: acquiring an image stream from an image sensor, wherein the image sensor is fixedly embedded in a casing of the handheld communications device at an orientation such that when the handheld communications device is held in a hand of a user with the touch-sensitive display opposed to a face of the downward looking user, an optical axis of the image sensor extends generally in a direction of the path of travel; identifying in the acquired image stream an object in the path of travel of the user; looking-up information about the identified object; presenting, on the touch-sensitive display in real-time the acquired image stream including the identified object; and presenting on the touch-sensitive display a visual indicator associated with the identified object.

In accordance with another disclosed embodiment, an image capture casing for a handheld mobile device having an upward facing display surface and an opposing lower surface is provided. The image capture casing may include a housing for surrounding at least a portion of the handheld mobile device. The image capture casing may also include at least one image sensor mounted in the housing and having a first optical axis extending in a first direction and second optical axis extending in a second direction that differs from the first direction, wherein the first optical axis is configured to be oriented at a fixed obtuse angle with respect to the lower surface when the handheld mobile device is retained by the housing. The image capture casing may further include circuitry for conveying from the at least one image sensor, image data for real-time display on the display surface.

In accordance with another disclosed embodiment, a handheld mobile communication device is provided. The handheld mobile communication device may include a display, and a housing for retaining the display along an upper surface thereof and having a lower surface opposite the upper surface, and wherein an edge is located between the upper surface and the lower surface. The handheld mobile communication device may also include at least one first image sensor embedded in the upper surface and having a first optical axis facing in a first direction away from the upper surface, at least one second image sensor embedded in the lower surface and having a second optical axis extending in a second direction away from the lower surface, and at least one third image sensor at least partially embedded in the edge and having a third optical axis extending in a third direction away from the edge, and wherein the first optical axis, the second optical axis, and the third optical axis diverge from each other. The handheld mobile communication device may further include at least one processor within the housing for receiving image data from the at least one first image sensor, the at least one second image sensor and the at least one third image sensor, and for enabling presentation, on the display, of the image data from the at least one first image sensor, the at least one second image sensor, and the at least one third image sensor.

In accordance with another disclosed embodiment, an image capture casing for a mobile device having an upper display surface and an opposing lower surface is provided. The image capture casing may include a housing for surrounding at least a portion of the mobile device, the housing having an upper side, a lower side, and an edge interconnecting the upper side and the lower side. The image capture casing may also include a plurality of image sensors embedded in the edge, wherein each of the plurality of image sensors has an optical axis, and wherein when the mobile device is retained by the housing, each optical axis diverges from axes normal to the upper display surface and the lower surface. The image capture casing may further include circuitry for conveying image data from the plurality of image sensors to the display.

In accordance with another disclosed embodiment, a computer-readable medium configured for use in a mobile communications device is provided. The computer-readable medium may contain instructions that when executed by a processor cause the processor to perform steps including: receiving from at least one sensor in the mobile communications device a first indication that the mobile communications device is in forward motion; receiving from the at least one sensor in the mobile communications device a second indication that an image sensor in the mobile device is oriented for image capture; and in response to both the first indication and the second indication, automatically causing a real-time presentation of a forward path image to be presented on a display of the mobile device.

In accordance with another disclosed embodiment, a computer-readable medium configured for use in a mobile communications device is provided. The computer-readable medium may contain instructions that when executed by a processor cause the processor to perform steps including: receiving from at least one image sensor associated with the mobile communications device image data representing an environment of a user as the user moves along a travel path; selecting a field of view window from the image data for real-time display on the mobile communications device, wherein the field of view window corresponds to the travel path of the user; and presenting on the display simultaneously with an interactive user application window, the field of view window, and omitting from presentation on the display image data outside the field of view window.

In accordance with another disclosed embodiment, a computer-readable medium configured for use in a mobile device is provided. The computer-readable medium may contain instructions that when executed by a processor cause the processor to perform steps including: receiving from at least one image sensor associated with the mobile device image data representing an environment of a user as the user moves along a travel path; receiving from at least one sensor information reflective of an activity in which the user is involved; accessing in memory indicators of a plurality of activities and an associated field of view window associated with each activity; selecting a field of view window for real-time display on the mobile communications device, wherein the selected field of view window associated with the activity in which the user is currently involved; and applying the selected field of view window to the display of the mobile device.

In accordance with another disclosed embodiment, a computer-readable medium configured for use in a mobile communications device is provided. The computer-readable medium may contain instructions that when executed by a processor cause the processor to perform steps including: receiving from at least one image sensor associated with the mobile communications device a real-time image stream from an environment of a user as the user moves along a travel path; presenting on a touch screen display of the mobile communications device the real-time image stream; presenting on the touch screen display of the mobile communications device simultaneously with the real-time image stream, an interactive user application; enabling the user using the touch screen display to touch a region associated with the real-time image stream, and cause at least one frame of the real-time image stream to be transferred to the interactive user application; and executing an action in the interactive user application that involves the at least one frame.

In accordance with another disclosed embodiment, a handheld communications device for displaying bi-directional video streams captured along transverse axes is provided. The handheld communications device may include a housing having a upper surface, a lower surface, and a side edge. The handheld communications device may also include a touch-sensitive screen located in the upper surface and at least one processor programmed. The handheld communications device may also include a first image sensor having a first optical axis extending in a first direction away from the upper surface in a manner configured to capture a face of a user when the handheld communications device is held in a hand of the user viewing the touch-sensitive screen, and second image sensor at least partially embedded in the side edge and having a second optical axis extending in a second direction away from the side edge in a manner configured to capture a travel path of the user when handheld communications device is held in the hand of the user viewing the touch-sensitive screen, and wherein the first direction is transverse to the second direction. The at least one processor may be programmed to: acquire a first real-time image stream from the first image sensor of the face of the user; acquire a second real-time image stream from the second image sensor of the travel path of the user; and present in real-time on the touch-sensitive display, a bidirectional presentation of the face of the user and the travel path of the user.

In accordance with another disclosed embodiment, a handheld mobile communications device configured to provide directional guidance to a user looking downward while traversing a forward path of travel is provided. The handheld mobile communications device may include a housing having a upper surface, a lower surface, and a side edge. The handheld mobile communications device may also include a touch-sensitive display located in the upper surface, a GPS chip, and at least one processor. The handheld mobile communications device may further include an image sensor fixedly embedded in the housing at an orientation such that when the handheld mobile device is held in a hand of a user with the touch-sensitive display opposed to a face of the downward looking user, an optical axis of the image sensor extends generally in a direction of the path of travel. The at least one processor may be programmed to: receive from a directional guidance application a series of turn-by-turn directions to a destination; display on the touch-sensitive display as the user traverses the forward path with the touch-sensitive display opposed to the user's face, a real-time image stream from the image sensor; and use location information obtained from the GPS chip, to display at least one visual indicator of the turn-by-turn directions on the touch-sensitive display simultaneously with the display of the real-time image stream.

In accordance with another disclosed embodiment, a removable case for a handheld mobile phone is provided. The case may include a housing and at least one image sensor embedded in the housing. The case may also include a connector in the housing configured to engage a port of the handheld mobile device when the handheld mobile device is seated in the case. The case may further include at least one conduit embedded in the case extending between and electrically connecting the at least one image sensor with the connector to thereby enable real-time image streaming from the at least one image sensor to the handheld mobile device when the handheld mobile device is seated in the case.

In accordance with another disclosed embodiment, a system for crowd-sourced generation of a street view map using image data aggregated from a plurality of image sensors embedded in edges of mobile phones is provided. The system may include at least one processor configured to: maintain a street view map of a geographical area, wherein GPS coordinates are associated with locations on the street view map; receive from the plurality of image sensors embedded in edges of a plurality mobile phones of a plurality of users, street view images; receive from each of the plurality of mobile phones a GPS location associated with each of the received street view images; and update the street view map with received street view images from the plurality of image sensors when GPS locations associated with received street view images correspond to GPS locations on the street view map.

In accordance with another disclosed embodiment, a method for crowd-sourced generation of a street view map using image data aggregated from a plurality of image sensors embedded in edges of mobile phones is provided. The method may include maintaining a street view map of a geographical area, wherein GPS coordinates are associated with locations on the street view map; receiving from the plurality of image sensors embedded in edges of a plurality mobile phones of a plurality of users, street view images; receiving from each of the plurality of mobile phones a GPS location associated with each of the received street view images; and updating the street view map with received street view images from the plurality of image sensors when UPS locations associated with received street view images correspond to UPS locations on the street view map.

In accordance with another disclosed embodiment, a computer-readable medium configured for use in a mobile communications device is provided. The computer-readable medium may contain instructions that when executed by a processor cause the processor to perform steps including: receiving a first real-time image stream from a first image sensor having a first optical axis extending in a first direction; receiving a second real-time image stream from a second image sensor having a second optical axis extending in a second direction that differs from the first direction; determining a field of view window from the first real-time image stream for display on the mobile communications device; presenting on a display of the mobile communications device a real-time presentation that corresponds with the determined field of view window; and making an adjustment to the field of view window in response to a user's interaction with the display, wherein the adjustment includes at least one of selecting a new field of view window from the first real-time image stream, and selecting a new field of view window from the second real-time image stream.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2A is a schematic illustration of a first example device consistent with the present disclosure from a first viewpoint;

FIG. 2B is a schematic illustration of the first example device shown in FIG. 2A from a second viewpoint;

DETAILED DESCRIPTION

Figure 1A:
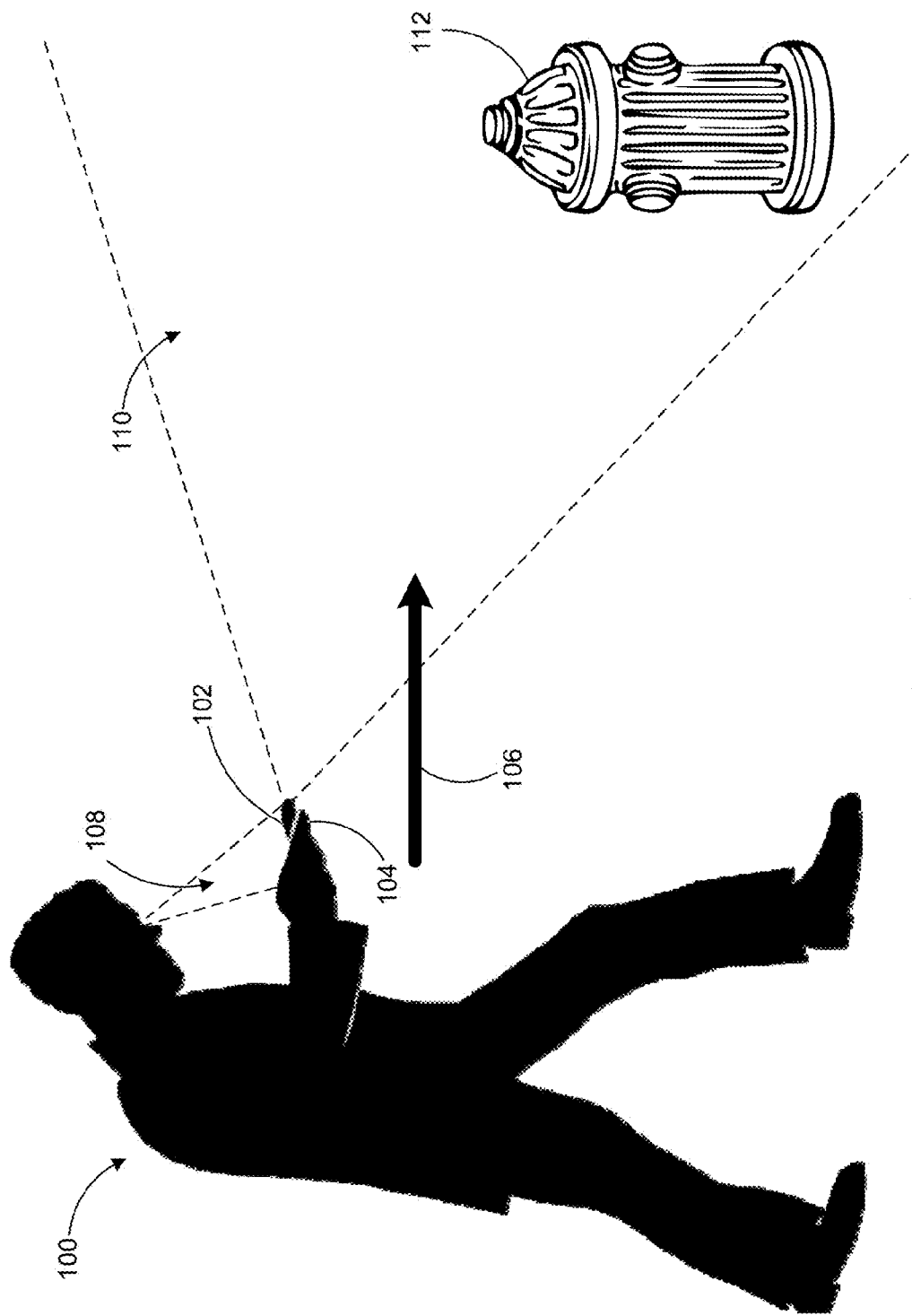
FIG. 1A is a schematic illustration of a user walking while staring at a mobile communications device from a first view point.

The following detailed description refers to the accompanying drawings. Wherever possible, the same reference numbers are used in the drawings and the following description to refer to the same or similar parts. The disclosure is not limited to the described embodiments and examples. Instead, the proper scope is defined by the appended claims.

Disclosed embodiments may involve an edge camera assembly configured to capture images of the environment in front of a user for causing a real-time image presentation on a display of a mobile communications device. As used herein the term "mobile communications device" refers to any portable device with a display that can communicate with a wireless network, including, but not limited to a wireless communication chipset, a smartphone, a tablet, a smartwatch, a user equipment (UE), a personal digital assistant, and more. It is noted that the terms "handheld mobile communications device," "handheld mobile device," "mobile communications device," and "mobile device" may be used in the interest of brevity and may refer to any of the variety of devices listed above.

The disclosed edge camera assembly may include a system with image capturing capabilities that may engage with or be part of the mobile communications device. The edge camera assembly may include a housing, an image sensor, and circuitry for conveying image data from the image sensor. Consistent with disclosed embodiments, the image sensor may be disposed in an edge surface interconnecting an upper side and a lower side of a casing associated with the mobile communications device. In a first aspect of the disclosure, a removable case for mobile communications devices is provided. In this aspect, the edge camera assembly may be separable from the mobile communications device, but configured to engage with said mobile communications device when the mobile communications device is seated in the case. In a second aspect of the disclosure, a mobile communications device is provided. In this aspect, the edge camera assembly may be integral with a chassis of said mobile communications device.

The two aspects of the present disclosure may involve an image capture casing (also known as "casing"). The term "casing" is used herein to designate any protective element for shielding components of the edge camera assembly. The casing may be constituted from a resilient material (such as thermoplastic rubber, synthetic plastic, polyurethane, metal, and more) that is molded into a desired shape. In the first approach, the image capture casing may be a removable case that provides protection to both the edge camera assembly and the mobile communications device. In the second approach the image capture casing may be integrated into the mobile communications device and serves as a cover of the device.

An image capture casing in accordance with embodiments of the disclosure may include a housing for surrounding at least a portion of the mobile communications device. The term "housing" broadly includes any structure or enclosure designed to accommodate at least a portion of the mobile communications device or components of the mobile communications device. In one example, the housing may have an elongated portion that is capable of being grasped in the hand of a user, with a length substantially longer than a width and/or thickness. The housing may have a cross-section that is square, rectangular, rounded rectangular, or any other regular or irregular shape capable of being grasped. Such a structure may permit repeatable, consistent grasping during use. As used in this specification and the appended claims, the terms "upper," "top," "lower," "bottom," "front," "back," and "rear" refer to portions of or positions of the housing when the elongated portion of the housing is oriented horizontally and the display side of the mobile communications device faces up.

In some embodiments, the edge camera assembly may include an image sensor mounted or embedded in the housing. The terms "mounted in the housing" and "embedded in the housing" mean that the image sensor is being fully or partially encapsulated in the housing. An image sensor may be a device capable of detecting and converting optical signals in the near-infrared, infrared, visible, and ultraviolet spectrums into electrical signals. The electrical signals may be used to generate image data. The term "image data" includes any form of data retrieved from optical signals in the near-infrared, infrared, visible, and ultraviolet spectrums (e.g., information, image, and/or video stream). Examples of image sensors associated with the edge camera assembly may include digital cameras, phone cameras, semiconductor charge-coupled devices (CCD), active pixel sensors in complementary metal-oxide-semiconductor (CMOS), or N-type metal-oxide-semiconductor (NMOS, Live MOS). Image sensors associated with the edge camera assembly may have a field of view greater than 90°, greater than 120°, or greater than 180°, or about 360°. In addition, image sensors associated with the edge camera assembly may have resolutions of 640×480, 1024×768, 1280×960, or any other suitable resolution.

Consistent with the present disclosure, the image sensor may be mounted (or embedded) in the housing such that when the housing is held by a walking user the optical axis of the image sensor may generally extend in the walking direction of the user. As used herein, the term "optical axis" designates an imaginary line that defines a path along which light propagates from the center of the camera's field of view to the center of the image sensor. In the present disclosure, the term "generally extends (or faces) in the walking direction of the user" broadly means that the field of view of the edge camera assembly covers a sector of the user's environment that corresponds with the walking direction of the user. In one example, the edge camera assembly may be associated with a 240-degree fish-eye lens that has a wide field of view. In another example, the field of view of the edge camera assembly is illustrated in FIG. 1B. In both examples, since the image sensor captures a sector of the environment that corresponds with the walking direction of the user, it means that the optical axis of the image sensor generally extends in the walking direction of the user.

The edge camera assembly may include circuitry for conveying captured image data from the image sensor. Consistent with disclosed embodiments, the image data may be displayed in real-time display on the mobile communications device. As used herein, the term "real-time" means generally with no observable latency between capturing an image and displaying the captured image. The term "circuitry" as used herein refers to all of the following: (a) hardware-only circuit implementations, such as implementations in only analog and/or digital circuitry (e.g., wires, electric connections); (b) combinations of circuits, software and/or firmware (e.g., a combination of processors, digital signal processors, software, and memories) that work together to cause an apparatus to perform various functions; and (c) circuits that require software or firmware for operation (e.g., a microprocessor or a portion of a microprocessor), even if the software or firmware is not physically present. In the first approach, the circuitry may include a connector configured to engage a port of the mobile communications device when the mobile communications device is seated in the removable case. In the second approach the circuitry may include a processor that is part of the mobile communications device.

Consistent with disclosed embodiments, the edge camera assembly may include or communicate with at least one processor configured to receive image data from the image sensor and to cause a presentation of a forward path image to be presented on a display of the mobile communications device. The at least one processor may constitute any physical device having an electric circuit that performs a logic operation on input or inputs. For example, the at least one processor may include one or more integrated circuits, microchips, microcontrollers, microprocessors, all or part of a central processing unit (CPU), graphics processing unit (CPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In one embodiment, the memory is configured to store indicators of a plurality of activities and an associated field of view window associated with each activity. This embodiment is disclosed in greater detail below with reference to FIG. 20.

In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically, or by other means that permit them to interact. In disclosed embodiments, the at least one processor may cause a real-time presentation of a forward path image on the display of the mobile communications device. Consistent with the present disclosure, the term "a real-time presentation" may encompass a small delay from the time the image sensor captures the images until the images are displayed on the mobile communications device. For example, the delay may be smaller than about 0.1 sec, smaller than about 0.05 sec, or smaller than about 0.01 sec.

Figure 1B:
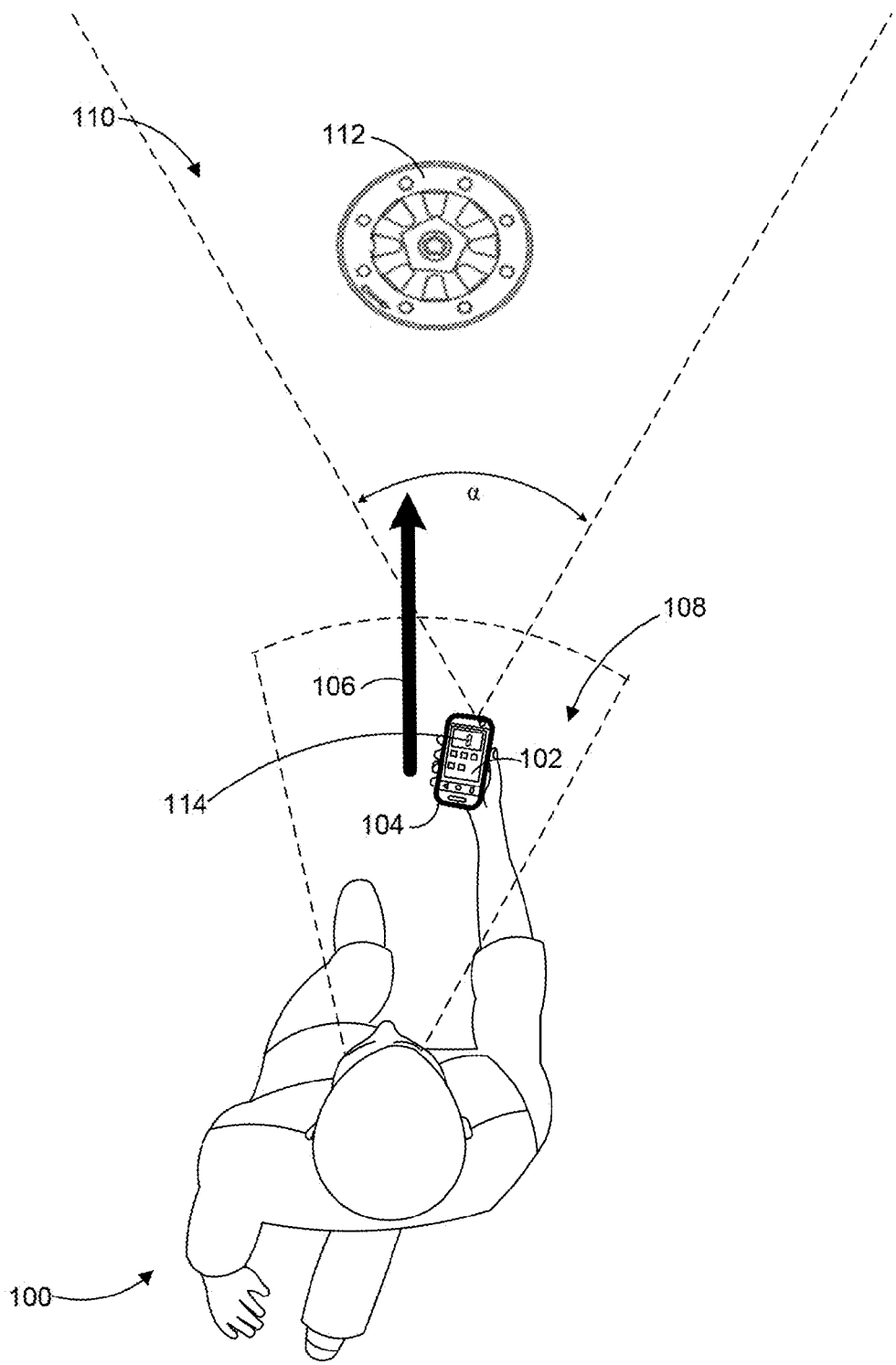
FIG. 1B is a schematic illustration of the user shown in FIG. 1A from a second view point.

FIG. 1A illustrates a situation in which a user 100 walks while staring at a mobile device 102 including a case 104. According to embodiments of the present disclosure, either mobile device 102 or a case 104 may include an edge camera assembly. The edge camera assembly may capture image data representing an environment of user 100 as user 100 moves along a travel path in a direction 106. The effective visual field of user 100 is represented by field of view 108 and an example field of view of the edge camera assembly is represented by field of view 110. Using the edge camera assembly, user 100 may avoid hitting an object 112 located along its travel path. In one embodiment, the edge camera assembly may cause an image presentation which shows the user the approaching obstacle on the device screen. In another embodiment, the edge camera assembly may trigger an alert or notification responsive to an obstacle detection algorithm running on processing circuits integral or otherwise functionally associated with the edge camera assembly.

FIG. 1B illustrates the same situation illustrated in FIG. 1A from a top-view perspective. As discussed above, when mobile device 102 is seated in case 104 the optical axis of the edge camera assembly generally faces in walking direction 106. FIG. 1B shows that horizontal component of field of view 110 covers a sector of the user's environment that corresponds with walking direction 106. The angular range of the horizontal component of field of view 110 is represented in FIG. 1B for illustrative purposes by angle α. In some embodiments, the angular range of the horizontal component of field of view 110 may be, for example, higher than 40°, higher than 65°, higher than 90°, higher than 120°, or higher than 180°. Alternatively, the angular range of the horizontal component of field of view 110 may be, for example, less than 160°, less than 110°, less than 70°, or less than 45°. Consistent with the present disclosure, mobile device 102 may display a real-time presentation 114 of the forward path that includes an indication that object 112 is located along the user's travel path. In other embodiments, as described in greater detail below, mobile device 102 may display overlay content on real-time presentation 114 of the forward path.

Figures 3A, 3B:
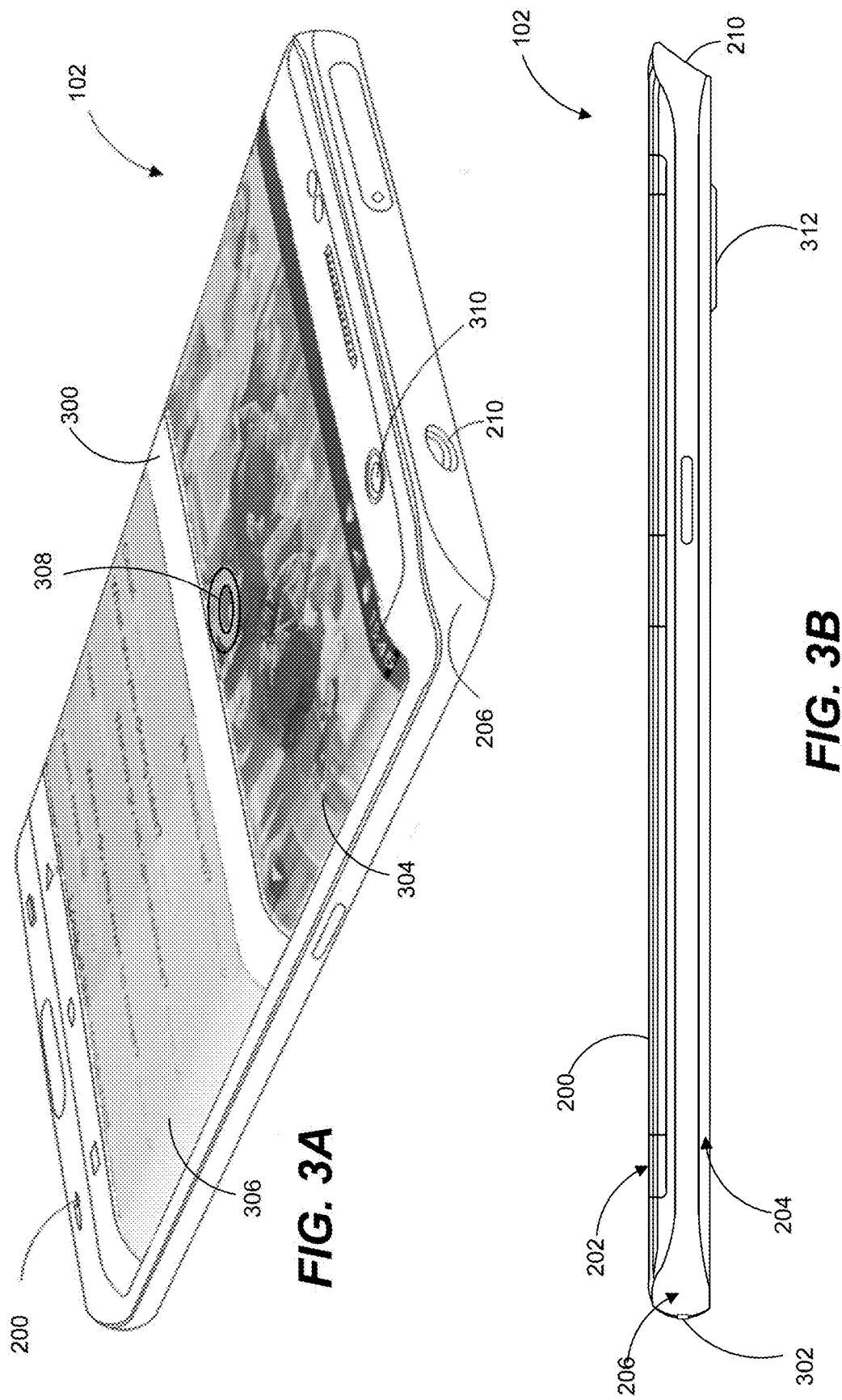
FIG. 3A is a schematic illustration of a second example device consistent with the present disclosure from a first viewpoint.
FIG. 3B is a schematic illustration of the second example device shown in FIG. 3A from a second viewpoint.

FIGS. 2A and 2B illustrate the first aspect of the present disclosure. Specifically, FIGS. 2A and 2B illustrate an edge camera assembly incorporated with removable case 104 that is selectively connectable and separable from mobile device 102. The edge camera assembly includes a housing 200 having an upper surface 202, an opposing lower surface 204, and an edge surface 206 located between upper surface 202 and lower surface 204. Edge surface 206 may extend upward from lower surface 204. The term "edge surface" (also known as "edge" or "peripheral edge") is used herein to denote a peripheral area interconnecting upper surface 202 and lower surface 204. In some embodiments, edge surface 206 may be flat and at right angles with respect to the main surfaces of housing 200. Alternatively, the edge surface may be at a rather different angle with respect to upper surface 202 and lower surface 204 and may be somewhat curved. FIGS. 3A and 3B depict another embodiment in which the edge surface is formed other than illustrated in FIGS. 2A and 2B. Consistent with the present disclosure, the edge camera assembly may also include circuitry 208 and image sensor 210. For illustration purposes only, circuitry 208 and image sensor 210 are depicted separately from housing 200. In fact, according to some embodiments, image sensor 210 may be fixedly secured or embedded within edge surface 206, such that its optical axis is fixedly tilted at an angle other than perpendicular to upper surface 202 and lower surface 204. For example, image sensor 210 may be fixedly located in a protrusion extending from lower surface 204.

The edge camera assembly may include an opening (e.g., aperture 212) configured to enable an optical axis of an additional image sensor of mobile device 102 to pass therethrough. The additional image sensor of mobile device 102 may be distinct from image sensor 210 mounted in housing 200. In some embodiments, removable case 104 may include a battery within housing 200 (not shown)

configured to power image sensor 210 and/or to provide power to mobile device 102. Accordingly, removable case 104 may further include a receiver for wirelessly charging the battery. Alternatively, circuitry 208 may be configured to convey power from a battery within mobile device 102 to image sensor 210. In other embodiments, edge camera assembly may also include a directional microphone (not shown) substantially aimed in a direction of an optical axis associated with image sensor 210.

In accordance with the first aspect of the present disclosure, the edge camera assembly may also include a connector 214 and at least one conduit 216 that are part of or associated with circuitry 208. In some embodiments, connector 214 may be configured to engage a port of mobile device 102 when mobile device 102 is seated in case 104. Moreover, conduit 216 may extend between and electrically connect image sensor 210 with connector 214 to enable real-time image streaming from image sensor 210 to mobile device 102. In one configuration of removable case 104, image sensor 210 may be located in a portion of edge surface 206 opposite connector 214, such that conduit 216 may traverse housing 200 between image sensor 210 and connector 214. Consistent with the present disclosure, circuitry 208 may also include interface circuits (not shown) for interfacing and transferring data to mobile device 102. The transferred data may include image, video data, or 3D scan data acquired by image sensor 210. In some embodiments, circuitry 208 is configured to convey the image data over a wired connection. For example, the interface circuits may comply with a wired standard such as USB, Micro-USB, HDMI, Micro-HDMI, Firewire, Apple, etc. In other embodiments, circuitry 208 is configured to convey the image data over a wireless connection. For example, the interface circuits may comply with a wireless standard such as Bluetooth, WiFi, NFC, ZigBee, etc.

FIG. 2B is another illustration of the first aspect of the present disclosure, from a second viewpoint. The viewpoint shown in FIG. 2B is from a side orientation of removable case 104. In this illustration, mobile device 102 is seated in case 104; therefore the edge camera assembly enables real-time image streaming from image sensor 210 to mobile device 102. In some embodiments, circuitry 208 may enable image sensor 210 to be controlled by mobile device 102. For example, image sensor 210 may be activated in response to acceleration detected by a sensor in mobile device 102.

FIGS. 3A and 3B illustrate the second aspect of the present disclosure. Specifically, FIGS. 3A and 3B illustrate an edge camera assembly integrated into mobile device 102. Consistent with the second aspect of the present disclosure the edge camera assembly also includes housing 200 (with upper surface 202, lower surface 204, and edge surface 206), circuitry 208 (not shown), and image sensor 210. As depicted in FIGS. 3A and 3B, edge surface 206 may be curved and at angle other than perpendicular to upper surface 202 and lower surface 204. In some embodiments, mobile device 102 may include a touch-sensitive display 300 for presenting the real-time image stream captured by image sensor 210. Additionally, touch-sensitive display 300 together with circuitry 208 can, for example, detect input from user 100. Mobile device 102 may also include a port 302, which may be an interface between a power source mid circuitry 208. In one embodiment, port 302 may be used to charge the battery of mobile device 102. In another embodiment, port 302 may be used to connect mobile device with another electric device. For example, when the edge camera assembly is incorporated in removable case 104, port 302 may be used to form a communication channel between image sensor 210 and mobile device 102.

Consistent with the present disclosure, edge camera assembly enables mobile device 102 to receive from image sensor 210 a real-time image stream from the environment of user 100, and to present on touch-sensitive display 300 a real-time image streaming window 304 simultaneously with an interactive user application window 306. Because there is only limited space on touch-sensitive display 300 to present images alongside other apps, the display real estate used for navigation must be efficiently used. In one embodiment, mobile device 102 may initially present on about 50% of touch-sensitive display 300 the interactive user application window 306 and on about 50% of touch-sensitive display 300 real-time image streaming window 304. In another embodiment, mobile device 102 may initially present on at least about 60% of touch-sensitive display 300 the interactive user application window 306 and on no more than about 40% touch-sensitive display 300 real-time image streaming window 304. In another embodiment, mobile device 102 may initially present on at least about 70% of touch-sensitive display 300 the interactive user application window 306 and on no more than about 30% touch-sensitive display 300 real-time image streaming window 304. User 100 may provide input (e.g., using GUI feature 308) to change the ratio between interactive user application window 306 and real-time image streaming window 304. For example, user 100 may change the ratio between interactive user application window 306 and real-time image streaming window 304 such that real-time image streaming window 304 covers about 100% of touch-sensitive display 300. In another embodiment, mobile device 102 may enable user 100 to select the field of view from the image data to be presented in real-time image streaming window 304. Mobile device 102 may initially display a field of view that is estimated to correspond with the travel path of user 100 (e.g., using image processing algorithms that identify objects in the image data). But in some cases, user 100 may desire to change the field of view presented on real-time image streaming window 304. This embodiment is discussed in greater detail below with reference to FIG. 15.

Several types of mobile device 102 may further include a first additional image sensor 310 having an optical axis directed transverse to upper surface 202 (i.e., the selfie camera) and a second additional image sensor 312 embedded beneath lower surface 204 having an optical axis directed transverse to lower surface 204 (i.e., the back camera). Consistent with the present disclosure, mobile device 102 may receive, via circuitry 208, image data from image sensor 210, first additional image sensor 310, and second additional image sensor 312. In one embodiment, user 100 may switch between the image sensors, such that real-time image streaming window 304 may present image data from image sensor 210, first additional image sensor 310, or second additional image sensor 312. This embodiment is discussed in greater detail below with reference to FIG. 16. In another embodiment, mobile device 102 may cause a simultaneous image presentation on touch-sensitive display 300 from at least two image sensors out of image sensor 210, first additional image sensor 310, and second additional image sensor 312. Simultaneous image presentation may result from aggregating image data captured by image sensor 210 and image data captured by second additional image sensor 312 such that an aggregated image may be displayed on touch-sensitive display 300. Alternatively, simultaneous image presentation may include streaming images in each window from a different image sensor.

This embodiment enabled mobile device 102 to present in real-time on touch-sensitive display 300, a bidirectional presentation of the face of user 100 and the environment in front of user 100. The bidirectional presentation may be shared or posted online. This embodiment is discussed in greater details below with reference to FIG. 17.

Figure 4A:
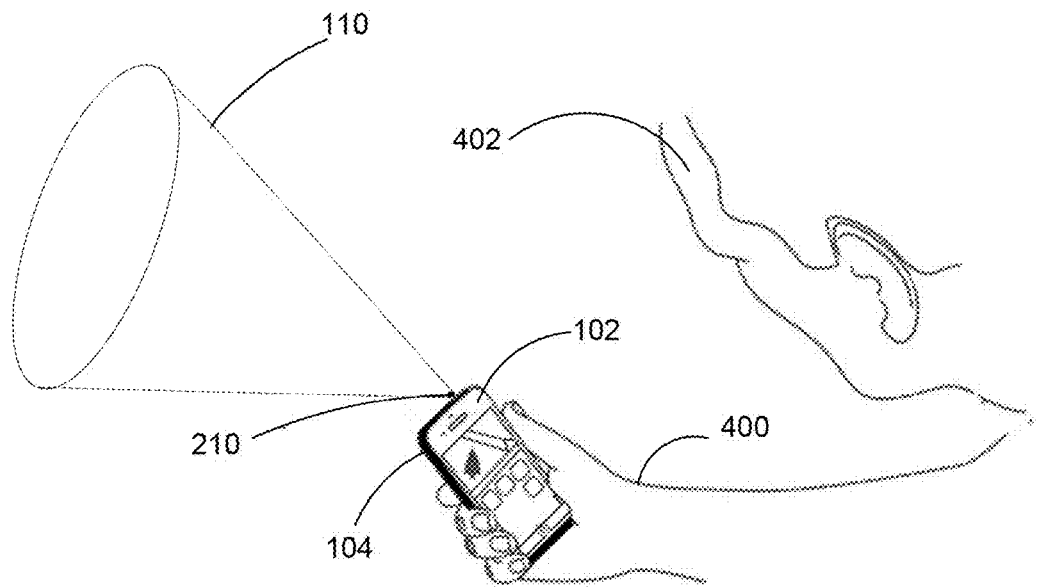
FIG. 4A is a schematic illustration of the field of view of an edge camera assembly associated with the first example device shown in FIG. 2A.
Figure 4B:
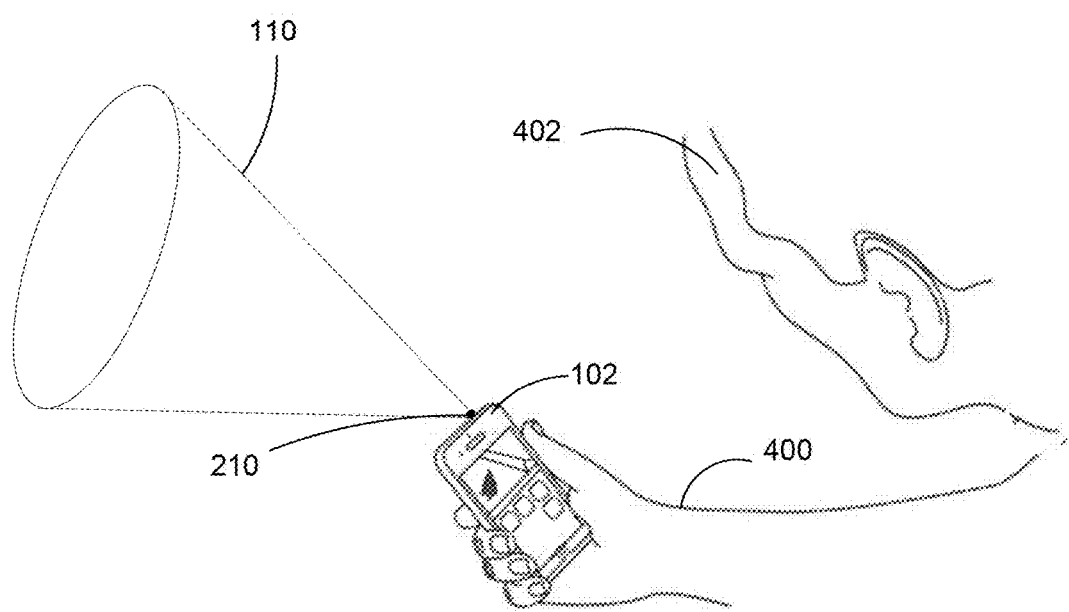
FIG. 4B is a schematic illustration of the field of view of an edge camera assembly associated with the second example device shown in FIG. 3A.

FIG. 4A and FIG. 4B are perspective illustrations of edge camera assemblies according to the first and second aspects of the disclosure. Both figures illustrate an example field of view 110 of image sensor 210 when mobile device 102 is held in a hand 400 of user 100 with touch-sensitive display 300 opposed to a face 402 of the downward looking user 100. As shown, field of view 110 may extend generally in a direction of the path of travel. In one example, field of view 110 may capture a sector of between 20 to 80 degrees relative to a vertical axis of the user's standing body. According to both aspects of the disclosure, the direction of field of view 110 may be adjustable. For example, field of view 110 may be adjusted by physically changing the orientation of mobile device 102 or by physically changing a relative direction of an aperture of image sensor 210 relative to mobile device 102. In some embodiments, the physical orientation of image sensor 210 may also be changed manually or by using electromechanical actuators. Alternatively, the field of view 110 may be adjusted digitally by changing filtration of the output from one or more image sensors 210.

Figure 5:
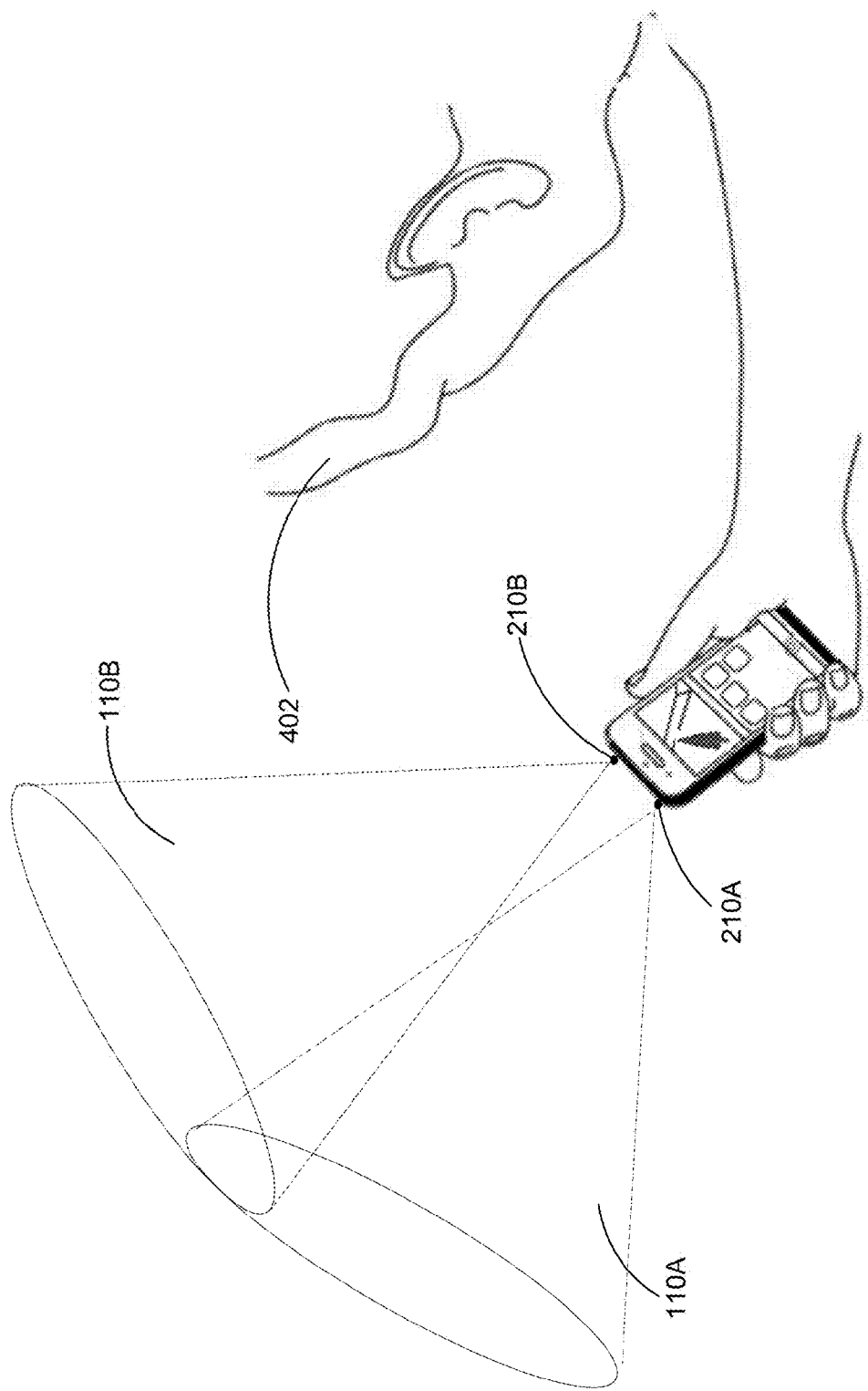
FIG. 5 is a schematic illustration of the fields of view of an edge camera assembly with a plurality of image sensors associated with the first example device shown in FIG. 2A.

FIG. 5 is a perspective illustration of an edge camera assembly according to the first aspect of the disclosure. In this illustration, the edge camera assembly includes a plurality of image sensors 210 embedded in edge surface 206. Each image sensor 210 (e.g., 210A and 219B) may be associated with optics (such as lens, filter, and more) and optionally an illuminator. Embodiments including a structured light illuminator may include a corresponding 3D decoder, which may provide depth information for points on objects imaged by the edge camera assembly. In some embodiments, each of the plurality of image sensors 210 has an associated field of view (e.g., field of view 110A and field of view 110B) and the field of view of at least one of the plurality of image sensors 210 overlaps with the field of view of another of the plurality of image sensors 210. In addition, the edge camera assembly may be associated with a processor for receiving image information from at least two of the overlapping image sensors 210, and for unifying image information from the at least two overlapping image sensors 210. For example, the processor may stitch together the image information from the at least two overlapping image sensors 210. Mobile device 102 may also present on touch-sensitive display 300 the unified image information from the at least two overlapping image sensors 210. In other embodiments, mobile device 102 may construct a virtual three-dimensional image using image data acquired from the at least two overlapping image sensors 210.

Using a plurality of image sensors 210 enable capturing a greater field of view 110 and obtaining more information. For example, the stereoscopic arrangement illustrated in FIG. 5 may provide depth information for points on the objects (e.g., object 112) captured by the edge camera assembly. Although only two image sensors 210 are shown, one skilled in the art would recognize that more than two image sensors 210 may be used, such as three image sensors 210, four image sensors 210, and more. Accordingly, the combined field of view of the plurality of image sensors 210 may be greater than 180°, e.g., about 240°, about 300°, or about 360°. There may be a large number of possible arrangements of the plurality of image sensors 210 in housing 200. For example, in a first configuration, edge camera assembly may include two image sensors 210: a first in a region of a right top corner, and a second in a region of a left top corner. In a second configuration, edge camera assembly may include three image sensors 210: a first in a top edge, a second in a region of a right top corner, and a third in a region of a left top corner. In a third configuration, edge camera assembly may include a first image sensor 210 with an optical view facing at least partially to an outward side of a top edge portion, a second image sensor 210 with an optical view facing at least partially outward of a right side edge portion, and a third image sensor 210 with an optical view facing at least partially outward of a left side edge portion.

Figure 6:
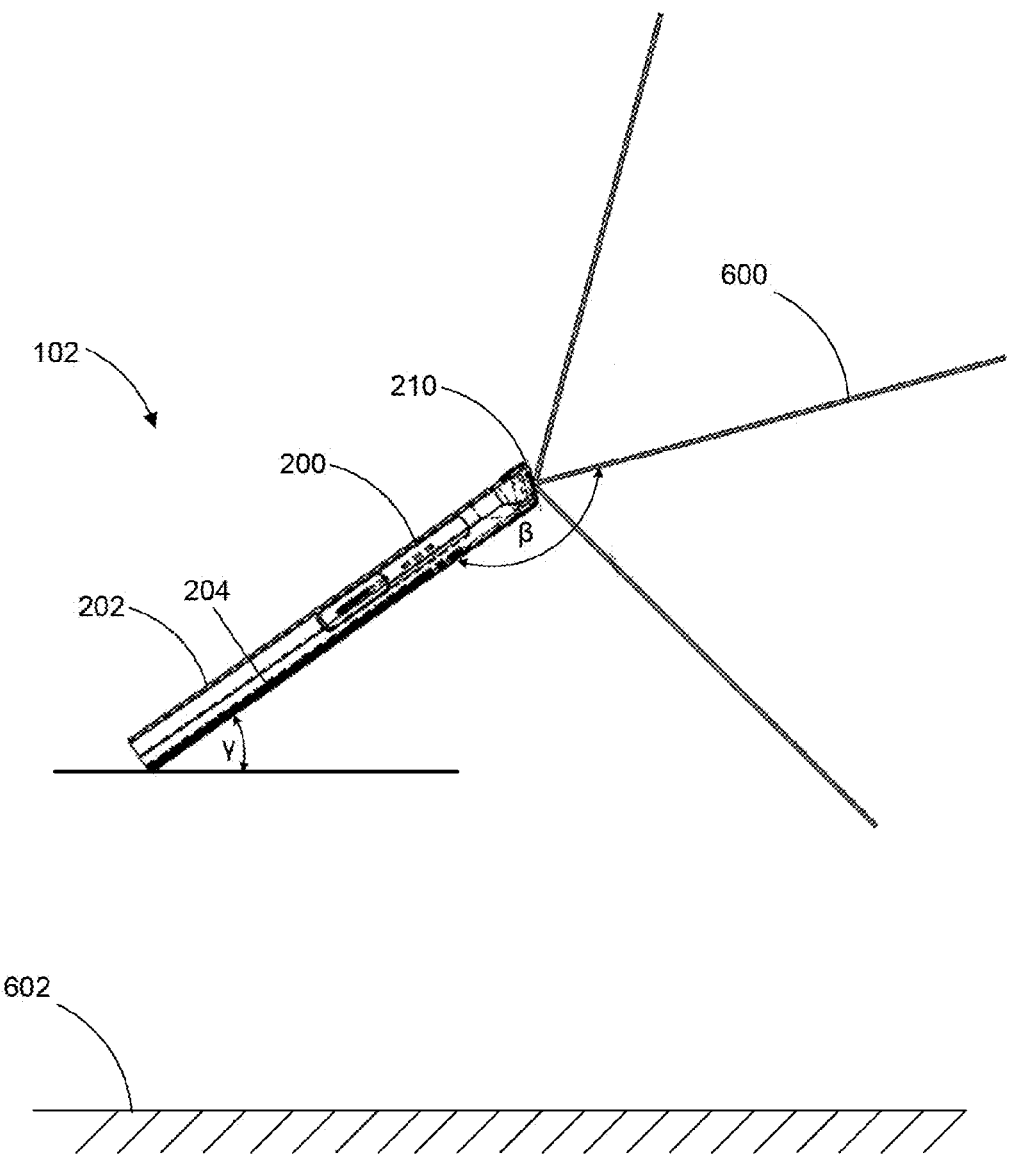
FIG. 6 is a schematic illustration that depicts the angle of the optical axis of an edge camera assembly according to embodiments of the disclosure.

FIG. 6 is a schematic illustration that depicts the angle of the optical axis of an edge camera assembly. Consistent with the disclosure above, the edge camera assembly may be incorporated in mobile device 102 or in removable case 104. In one embodiment, image sensor 210 mounted in housing 200 may have at least one optical axis 600 configured to be oriented at a fixed obtuse angle with respect to lower surface 204. An obtuse angle is one which is more than 90° but less than 180°. In FIG. 6, the obtuse angle of optical axis 600 is represented by angle β. As discussed above, image sensor 210 may be fixedly secured or embedded within edge surface 206, therefore optical axis 600 may also be fixed. In other words, user 100 cannot change the physical orientation of optical axis 600 without damaging mobile device 102. In one embodiment, housing 200 may include at least one channel therein (not shown) for retaining image sensor 210, and wherein an axis of the channel extends from housing 200 at an obtuse angle with respect to a portion of lower surface 204 when mobile device 102 is retained by housing 200. In some examples, angle β may be about 150° (i.e., any value between 145° to 155°), about 160 (i.e., any value between 155 to 165), or about 170 (i.e., any value between 165 to 175).

Typically, when housing 200 is held by a walking user 100 it is at an acute angle with respect to a plane 602 on which user 100 walks. An acute angle is one which is more than 0° but less than 90°. In FIG. 6, the holding angle of housing 200 is represented by angle γ. Consistent with the present disclosure, image sensor 210 may be oriented such that when housing 200 is held at holding angle γ at least one optical axis 600 generally faces in walking direction 106. In contrast to angle β, angle γ is not fixed. When user 100 walks, the holding angle of housing 200 may constantly change. However, typically when mobile device 102 is held by a walking user 100 the holding angle γ remains between 0° and 90°. For example, holding angle γ may be about 25° (i.e., any value between 20' to 30°), about 35° (i.e., any value between 30° to 40°), or about 45° (i.e., any value between 40° to 50°). Due to the changing nature of the holding angle γ, the direction of optical axis 600 cannot be parallel to the exact walking direction 106. But, as described above, as long as the horizontal component of field of view 110 covers a predefined portion (e.g., a sector) of the user's environment that corresponds with walking direction 106, at least one optical axis 600 is considered to generally face walking direction 106.

Figure 7:
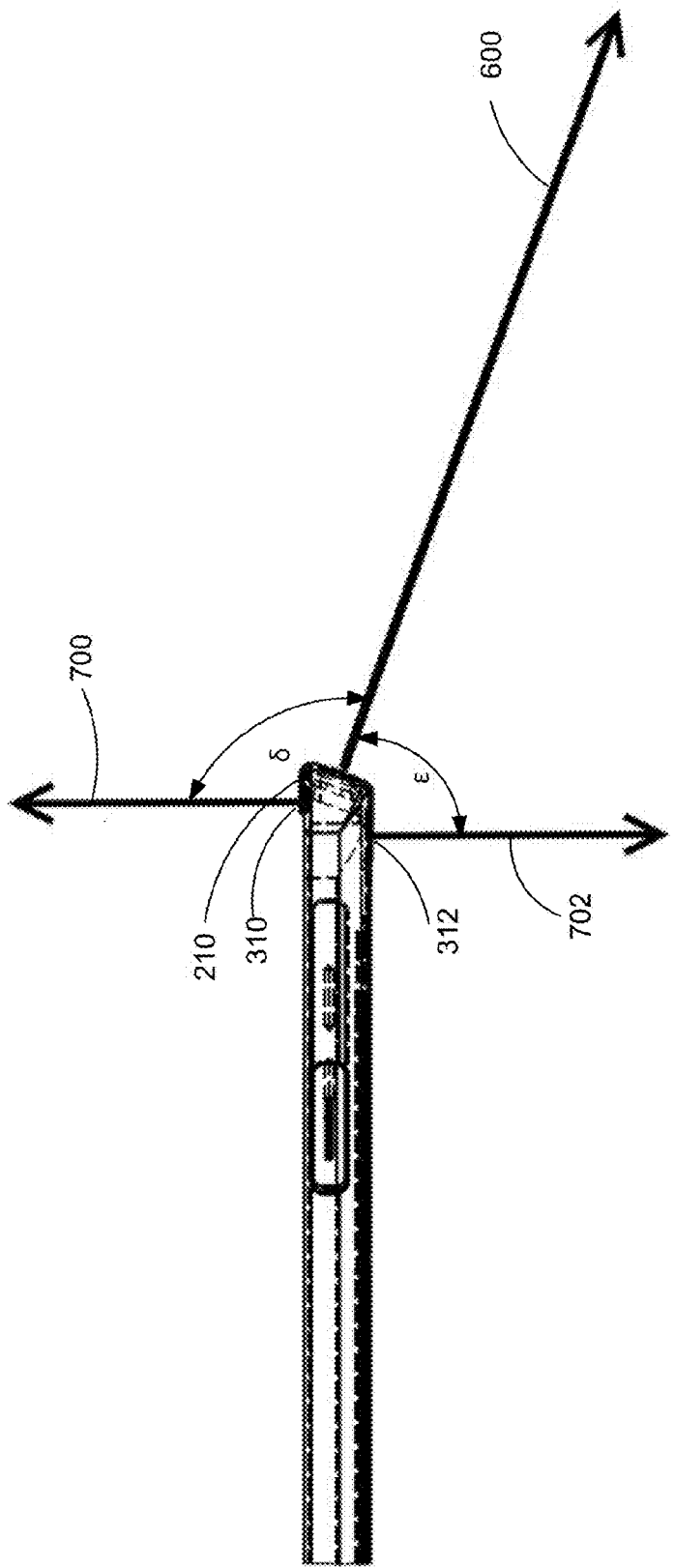
FIG. 7 is a schematic illustration that depicts the orientation of the optical axis of an edge camera assembly relative to other optical axes of cameras integral with a mobile communications device.

FIG. 7 is a schematic illustration that depicts the orientation of optical axis 600 relative to other optical axes of cameras integral to mobile device 102. Consistent with present disclosure, mobile device 102 may include first additional image sensor 310 having a first additional optical axis 700 facing in a first direction away from upper surface 202, and second additional image sensor 312 having a second additional optical axis 702 extending in a second direction away from lower surface 204. First additional image sensor 310 may be embedded in a side of housing 200 opposite to the side of second additional image sensor 312. Typically, first additional optical axis 700 and second additional optical axis 702 are substantially opposite to each other, such that the angle between them is about 180°. Consistent with embodiments of the disclosure, optical axis 600 of image sensor 210, which is at least partially embedded in edge surface 206, extends in at least one third direction away from edge surface 206. As illustrated in FIG. 7, optical axis 600, first additional optical axis 700, and second additional optical axis 702 may diverge from each other. Specifically, optical axis 600 and first additional optical axis 700 may be oriented at an obtuse angle with respect to each other. The angle between optical axis 600 and first additional optical axis 700 is represented by angle δ. In some examples, angle δ may be about 110° (i.e., any value between 100° to 120°). Similarly, optical axis 600 and second additional optical axis 702 may be oriented at an acute angle with respect to each other. The angle between optical axis 600 and second additional optical axis 702 is represented by angle ε. In some examples, angle ε may be about 40° (i.e., any value between 30° to 50°).

Figure 8:
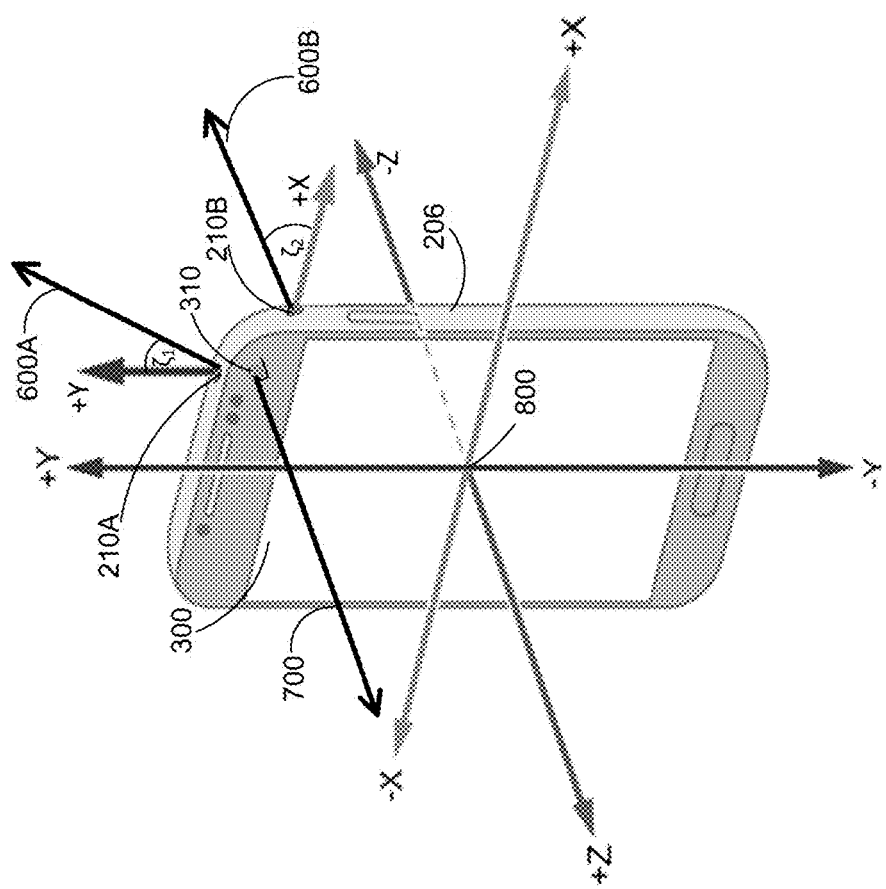
FIG. 8 is a schematic illustration that depicts the orientation of the optical axis of an edge camera assembly relative to the principal axes of the mobile device of the second example device shown in FIG. 3A.

FIG. 8 illustrates the orientation of optical axis 600 relative to the principal axes of mobile device 102. Herein, the term "principal axes" refers to a set of three mutually perpendicular axes in mobile device 102 about which the moment of inertia is at a maximum. For the purpose of simplicity and clarity, the disclosure assumes that mobile device 102 has substantially homogeneous mass distribution and that the central of mass converts with the center of symmetry 800. The principal axes may include a horizontal axis (i.e., X-axis), a longitudinal axis (i.e., Y-axis), and a lateral axis (i.e., Z-axis). The set of principal axes of mobile device 102 also defines three central axial planes, namely X-Y plane, X-Z plane, and Y-Z plane.

As shown in FIG. 8, mobile device 102 may include first image sensor 210A and second image sensor 210B, each of which may be fixedly embedded or secured in peripheral edge surface 206. In contrast to first additional image sensor 310 (and to second additional image sensor 312), first image sensor 210A and second image sensor 210B may have a fixed optical axis at a non-orthogonal angle relative to each of a first side of housing 200 (e.g., upper surface 202), a second side of the housing (e.g., lower surface 204), and a central axial plane (e.g., X-Y plane, X-Z plane, and Y-Z plane). Specially, first image sensor 210A is associated with optical axis 600A that is at a non-orthogonal angle $\zeta_1$ relative to central axial plane X-Y, and second image sensor 210B is associated with optical axis 600B that is at a non-orthogonal angle $\zeta_2$ relative to central axial plane Y-Z. In one example, optical axis 600A may be tilted at an angle $\zeta_1$ between about 5° and about 80° relative to the central axial plane X-Y. In another example, optical axis 600B may be tilted at an angle $\zeta_2$ between about 10° and about 70° relative to the central axial plane Y-Z. In one embodiment, the horizontal and/or vertical component of field of view 110 of each of image sensors 210A and 210B may be greater than 60°, greater than 75°, greater than 90°, or greater than 105°. Accordingly, the field of view of first image sensor 210A may partially overlap with a field of view of second image sensor 210B.

Figure 9:
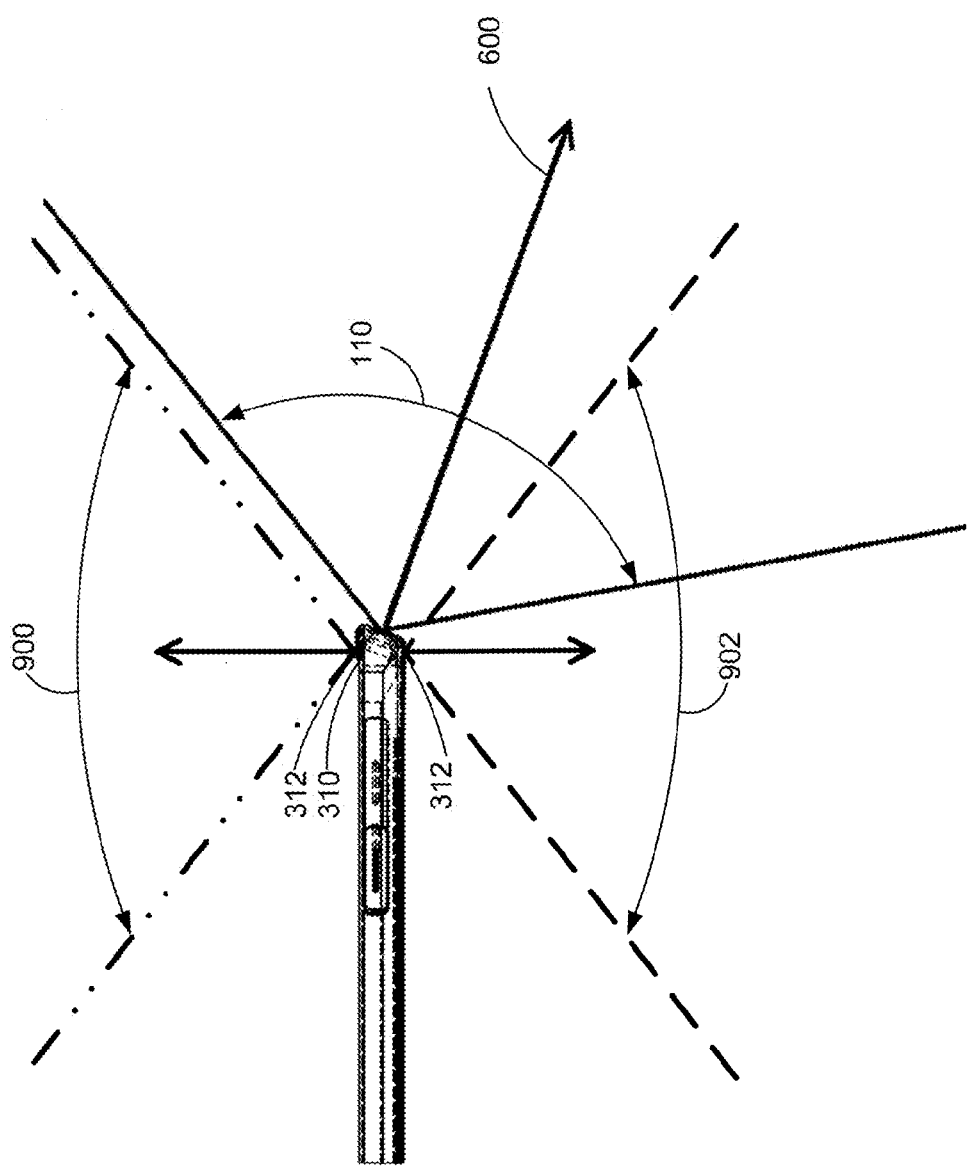
FIG. 9 is a schematic illustration that depicts the field of view of an edge camera assembly relative to other fields of view of cameras integral to the second example device shown in FIG. 3A.

FIG. 9 is a schematic illustration that depicts field of view 110 relative to other fields of view of cameras integral to mobile device 102. Consistent with the present disclosure, mobile device 102 may include at least one image sensor 210 (or be associated with at least one image sensor 210 when using removable case 104). At least one image sensor 210 may have at least one optical axis 600 extending in a first direction from the peripheral edge surface 206. Mobile device 102 may include first additional image sensor 310 embedded in housing 200 and having optical axis 700 extending in a second direction from upper surface 202 and second additional image sensor 312 embedded in housing 200 having optical axis 702 extending in a third direction from lower surface 204. As depicted, first additional image sensor 310 may be associated with a field of view 900 and second additional image sensor 312 may be associated with a field of view 902. As mentioned above with reference to FIG. 6, optical axis 600 may be oriented at a fixed obtuse angle with respect to lower surface 204. Additionally, as mentioned above with reference to FIG. 7, optical axis 600 may be oriented at a fixed obtuse angle with respect to first additional optical axis 700 and at a fixed acute angle with respect to second additional optical axis 702.

In one embodiment, field of view 110 partially overlaps with field of view 902 of second additional image sensor 312. In the removable case implementation, field of view 110 partially overlaps with field of view 902 of second additional image sensor 312 when mobile device 102 is seated in case 104. When image sensor 210 is integral with mobile device 102, field of view 110 may constantly partially overlap with field of view 902 of second additional image sensor 312. Mobile device 102 may include at least one processor within housing 200 configured to stitch together image data from at least one image sensor 210 and second additional image sensor 312. Specifically, the at least one processor may receive image data from at least one image sensor 210 and second additional image sensor 312, and apply stitching algorithms that take into account the relative position of the image sensors 210 and 312 and map the displacement of pixels in the different images. The stitching algorithm may be used to combine two (or more) images. For example, the stitching algorithm may include identifying an overlap area between two images, detecting and matching key points in the image data, selecting a projection surface, and more. Alternatively, at least one processor may be configured to receive image data from each of the image sensors (i.e., 210, 310, and 312) to enable presentation on touch-sensitive display 300 of at least a portion of the image data received from at least one image sensor 210, first additional image sensor 310, and second additional image sensor 312. In one example, the at least one processor may simultaneously receive image data from at least two of the at least one image sensor 210, first additional image sensor 310, and second additional image sensor 312, and cause a simultaneous image presentation on touch-sensitive display 300 from the at least two of said image sensors. Example of the simultaneous image presentation is presented in FIG. 17.

Figure 10:
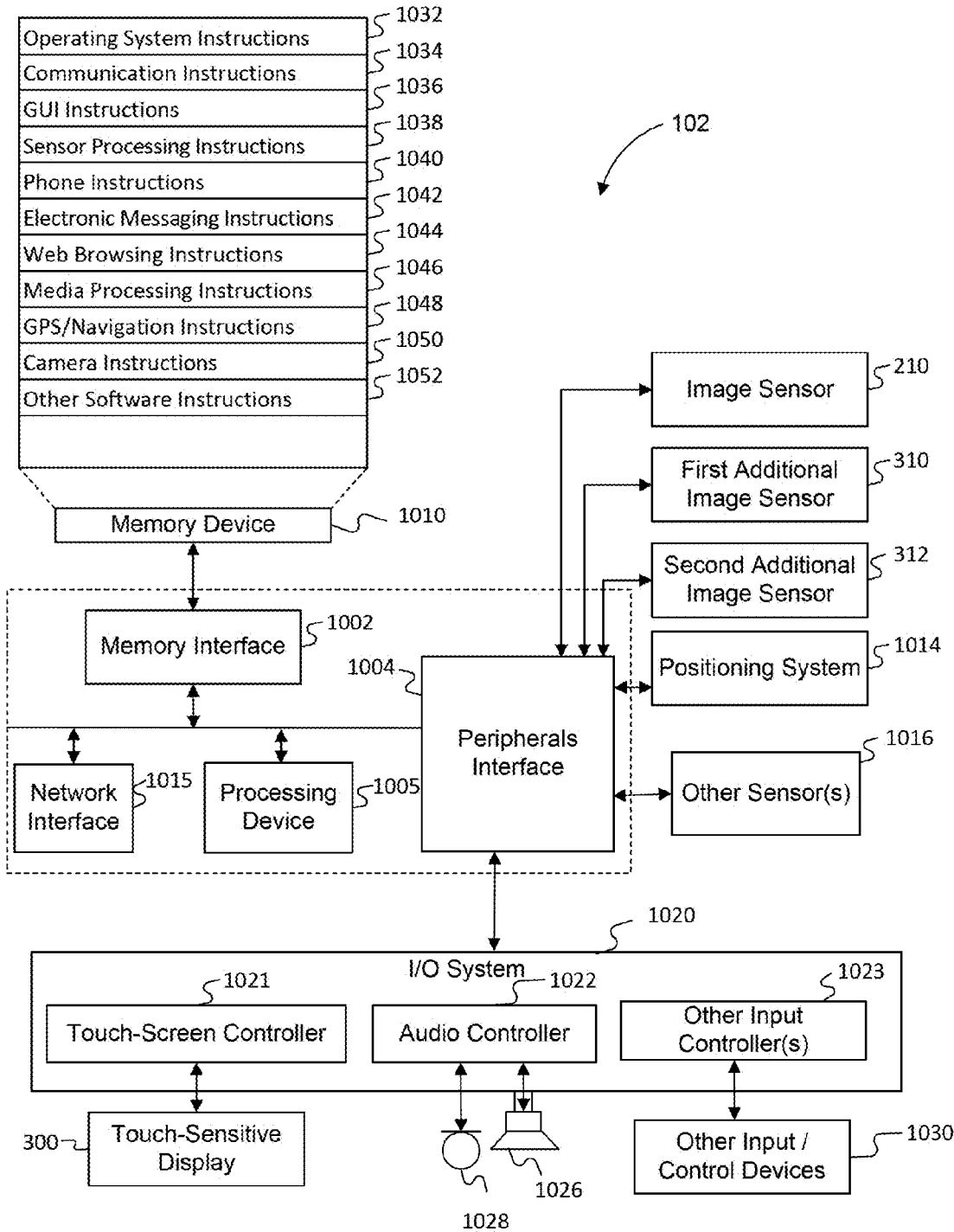
FIG. 10 is a functional block diagram illustrating the circuitry of an edge camera assembly associated with the second example device shown in FIG. 3A.

FIG. 10 is a functional block diagram of an edge camera assembly associated with the second example device shown in FIG. 3A. Consistent with the present disclosure, mobile device 102 may include a processing device 1005, a network interface 1015, a memory interface 1002, and a peripherals interface 1004. These components can be separated or can be integrated in one or more integrated circuits. The various components in mobile device 102 can be coupled by one or more communication buses or signal lines.

Sensors, devices, and subsystems can be coupled to the peripherals interface 1004 to facilitate multiple functionalities. For example, image sensor 210, first additional image sensor 310, second additional image sensor 312, and a positioning system (e.g., GPS receiver) 1014 can be coupled to the peripherals interface 1004. Other sensors 1016, such as a depth sensor, a motion sensor, a light sensor, a proximity sensor, a temperature sensor, and a biometric sensor, can also be connected to peripherals interface 1004 to facilitate related functionalities.

Communication functions may be facilitated through network interface 1015, which may be an Ethernet port connected to radio frequency receivers and transmitters and/or optical (e.g., infrared) receivers and transmitters. The specific design and implementation of network interface 1015 depends on the communications network(s) over which mobile device 102 is intended to operate. For example, in some embodiments, mobile device 102 includes network interface 1015 designed to operate over a GSM network, a GPRS network, an EDGE network, a Wi-Fi or WiMax network, and a Bluetooth® network.

I/O system 1020 may include a touch screen controller 1021, audio controller 1022, and/or other input controller(s) 1023. Touch screen controller 1021 may be coupled to a touch-sensitive display 300. Touch-sensitive display 300 and touch screen controller 1021 can, for example, detect contact, movement or break thereof using any of a plurality of touch sensitivity technologies, including but not limited to capacitive, resistive, infrared, and surface acoustic wave technologies as well as other proximity sensor arrays or other elements for determining one or more points of contact with the touch-sensitive display 300. Touch-sensitive display 300 can also, for example, be used to implement virtual or soft buttons and/or a keyboard.

Audio controller 1022 may be coupled to a speaker 1026 and a microphone 1028 to facilitate voice-enabled functions such as voice recognition, voice replication, digital recording, and telephony functions. The other input controller(s) 1023 may be coupled to other input/control devices 1030 such as one or more buttons, rocker switches, thumb-wheel, infrared port, USB port, and/or a pointer device such as a stylus.

Memory interface 1002 may be coupled to a memory device 1010. Memory device 1010 may include high-speed random access memory and/or non-volatile memory such as one or more magnetic disk storage devices, one or more optical storage devices, and/or flash memory (e.g., NAND, NOR). Memory device 1010 may store an operating system 1032, such as Android, PDS, RTXC Quadros, Linux, WINDOWS, or an embedded operating system such as VXWorkS. The operating system 1032 can include instructions for handling basic system services and for performing hardware dependent tasks.

Memory device 1010 may also store communication instructions 1034 to facilitate communicating with one or more additional devices, one or more computers and/or one or more servers. The memory device 1010 can include graphical user interface instructions 1036 to facilitate graphic user interface processing; sensor processing instructions 1038 to facilitate sensor-related processing and functions; phone instructions 1040 to facilitate phone-related processes and functions; messaging instructions 1042 to facilitate electronic-messaging related processes and functions; web browsing instructions 1044 to facilitate web browsing-related processes and functions; media processing instructions 1046 to facilitate media processing-related processes and functions; GPS/navigation instructions 1048 to facilitate GPS and navigation-related processes and instructions; camera instructions 1050 and/or other software instructions 1052 to facilitate other processes and functions.

In accordance with the present disclosure, when mobile device 102 is held in the hand of user 100 with touch-sensitive display 300 opposed to the face of the downward looking user 100, field of view 110 of image sensor 210 may extend generally in a direction of the path of travel. Image sensor 210 may therefore acquire an image stream along the direction of the path of travel. In some embodiments, sensor processing instructions 1038 include instructions to enable processing device 1005 to acquire the image stream from image sensor 210. In one embodiment, media processing instructions 1046 may include instructions to enable processing device 1005 to identify in the acquired image stream an object in the path of travel of user 100. The identified object may be, for example, a person, a sales establishment, or a fire hydrant. In addition, consistent with one embodiment of the present disclosure, communication instructions 1034 include instructions to enable processing device 1005 to look-up information about the identified object. For example, processing device 1005 can look up a person's name when the identified object is a person. For the example where the identified object is a sales establishment, processing device 1005 can look up details about products or services available at the sales establishment.

In some embodiments, processing device 1005 can present on touch-sensitive display 300, in real-time, the acquired image stream including the identified object. Further, processing device 1005 can present on touch-sensitive display 300, one or more visual indicators associated with the identified object. The term "visual indicator" means a displayed item or representation of content, for example, text, icons, graphics. For example, when the identified object is a sales establishment, the visual indicators may include the name of the sales establishment and an icon representing the sales products of the sales establishment. In some embodiments, the visual indicator may represent information about a commercial offer, for example, information about an on-going sale at the exemplary sales establishment. The visual indicator may be overlaid on the acquired real-time image stream. For example, the visual indicator representing an on-going sale at the exemplary sales establishment may be overlaid on the part of the real-time image stream corresponding to the sales establishment. In some embodiments, an offset may be added during overlay of the visual indicator to avoid obscuring area of interest in the image stream. Further, the visual indicator may include an indication that more information is available upon interaction with touch-sensitive display 300. For example, a clickable link. In response to detection of an interaction, processing device 1005 can be further programmed to execute an action. For example, in response to a touch-detection on a clickable link, processing device 1005 can display on touch-sensitive display 300, details of on-going sale at the exemplary sales establishment.

In some embodiments, other software instructions 1052 include instructions to enable processing device 1005 to determine whether user 100 is on a collision course with the identified object. As an example, processing device 1005 can determine that user 100 is on a collision course with a fire hydrant identified in the acquired image stream. In response to a determination of a collision, processing device 1005 may generate a warning of the collision course. The warning may be provided to user 100 using a visual indicator on touch-sensitive display 300, an audio warning using speaker 1026, a tactile warning using a tactile actuator included in other input/control devices 1030, or a combination of two or more warning systems. In response to the warning, user 100 can take evasive action to avoid collision with the fire hydrant.

In some embodiments, processing device 1005 can display on a first part of touch-sensitive display 300, the real-time image stream including the identified object, and display on a second part of touch-sensitive display 300, simultaneously with the real-time image stream, an interactive user application. Processing device 1005 may initially present on about 50% of touch-sensitive display 300 the real-time image stream including the identified object and on about 50% of touch-sensitive display 300 the interactive user application. In another embodiment, processing device 1005 may initially present on at least about 60% of touch-sensitive display 300 the real-time image stream including the identified object and on no more than 40% of touch-sensitive display 300 the interactive user application. User 100 may provide input, using a GUI feature on touch-sensitive display 300, to change the real-time image stream including the identified object and the interactive user application. An example of the interactive user application is a messaging application. User 100 may use the messaging application to send and receive messages and to communicate with another user. In some embodiments, media processing instructions 1046 include instructions to enable user 100 to select an image from the acquired image stream using processing device 1005. For example, an image of exemplary sales established acquired in image stream from image sensor 210. Further, messaging instructions 1042 may include instructions to enable user 100 to send the selected image to the other user using processing device 1005 via the messaging application.

In some embodiments, GPS/navigation instructions 1048 include instructions to enable processing device 1005 to generate a turn-by-turn directions to a destination using location information obtained from positioning system 1014. As user 100 traverses the forward path with the touch-sensitive display opposed to the user's face processing device 1005 can display on touch-sensitive display 300, a real-time image stream from image sensor 210. Processing device 1005 may use location information obtained from positioning system 1014 to display at least one visual indicator associated with the turn-by-turn directions on the touch-sensitive display simultaneously with the display of the real-time image stream. The turn-by-turn directions may be associated with a route of travel to the destination. In some embodiments, the visual indicator may include information about places along the route of travel. Specifically, processing device 1005 may provide visual indicators associated with places located at no more than a first predetermined distance from the route of travel and/or no more than a second predetermined distance from a current location of user 100. The second predetermined distance may be larger than the first predetermined distance. For example, processing device 1005 may provide visual indicators associated with places located at no more than 300 meters from the route of travel and no more than 500 meters from a current location of user 100. In other embodiments, positioning system 1014 comprises a compass and GPS/navigation instructions 1048 further include instructions to enable processing device 1005 to use the directional information obtained from the compass (in addition to the location information) to display the visual indicator associated with the turn-by-turn directions. The visual indicator may include an arrow indicating turn-by-turn directions, a representation of a compass, a number representing a distance to a next turn, a name of a sales establishment, or a name of a street.

In some embodiments, GPS/navigation instructions 1048 include instructions to enable processing device 1005 to receive location information from positioning system 1014. As user 100 traverses the forward path with the touch-sensitive display opposed to the user's face, processing device 1005 can display on touch-sensitive display 300, a real-time image stream from image sensor 210. Further, processing device 1005 may use location information obtained from positioning system 1014 to display at least one visual indicator on touch-sensitive display 300. As an example, processing device 1005 may use location information obtained from positioning system 1014 to display a visual indicator associated with a restaurant located in proximity to user 100. The real-time image stream and the visual indicator may be displayed on different parts of touch-sensitive display 300. In some embodiments, the visual indicator may be overlaid on the real-time image stream. In one embodiment, GPS/navigation instructions 1048 and other software instructions 1052 may enable processing device 1005 to generate augment reality content (e.g., visual indicators) on the real-time image streaming window 304 based on information derived from the interactive user application presented on interactive user application window 306. Specifically; the interactive user application may be a messaging application and the information may be derived using linguistic analysis techniques such as semantic-based text recognition, vector space analysis, rule-based analysis, statistical analysis, or other known techniques. For example, the information may include an indication about a status of the user 100, such that user 100 is hungry. Thereafter, processing device 1005 may present one or more visual indicators associated with restaurants in the area of user 100 overlaid on the real-time image stream.

Figure 11:
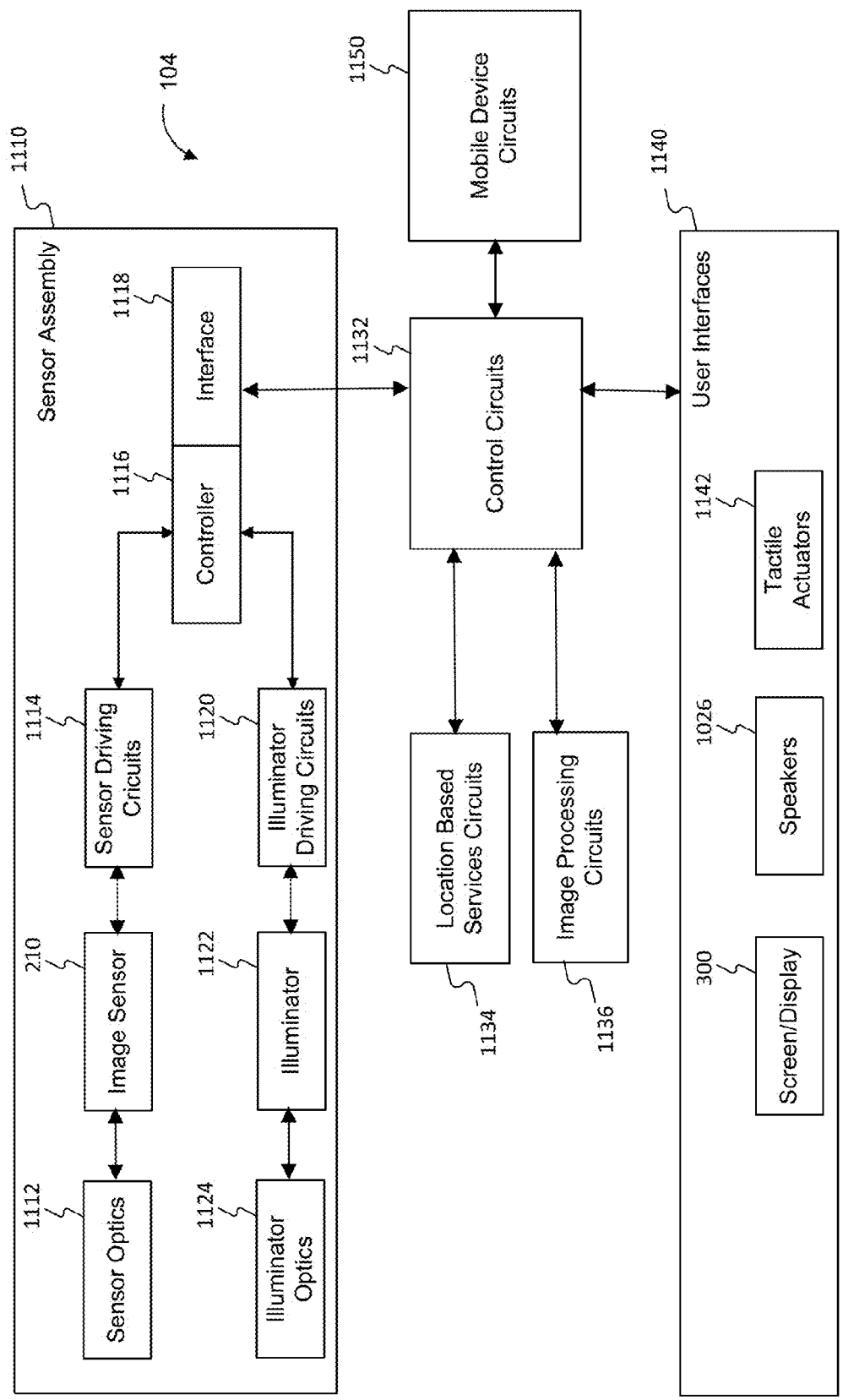
FIG. 11 is a functional block diagram illustrating the circuitry of an edge camera assembly associated with the first example device shown in FIG. 2A.

FIG. 11 is a functional block diagram of an edge camera assembly associated with the first example device shown in FIG. 2A. Consistent with the present disclosure, removable case 104 may include a sensor unit 1110. Sensor unit 1110 may include a depth sensor and image sensor 210, sensor optics 1112, and sensor driving circuits 1114. Sensor unit 1110 may further include an illuminator 1122, associated illuminator optics 1124, and illuminator driving circuits 1120. Illuminator 1122 may be, for example, a flash light source or a structured light source. Sensor unit 1110 may also comprise a controller 1116 and an interface 1118. Controller 1116 controls sensor driving circuits 1114 and illuminator driving circuits 1120. Consistent with this embodiment, the edge camera assembly may further comprise control circuits 1132, location based service circuits 1134, and image processing circuits 1136. One or more of control circuits 1132, location based service circuits 1134, and image processing circuits 1136 may be provided as part of the removable case or may be integrated into mobile device circuits 1150 of mobile device 102. Controller 1116 may communicate with control circuits 1132 via interface 1118. User interfaces of mobile device 102 comprise touch-sensitive display 300, speaker 1026, and tactile actuators 1142. A person skilled in the art would recognize that an edge camera assembly associated with removable case 104 may execute all the functions described above with reference to the edge camera assembly associated with mobile device 102.

Figure 12A:
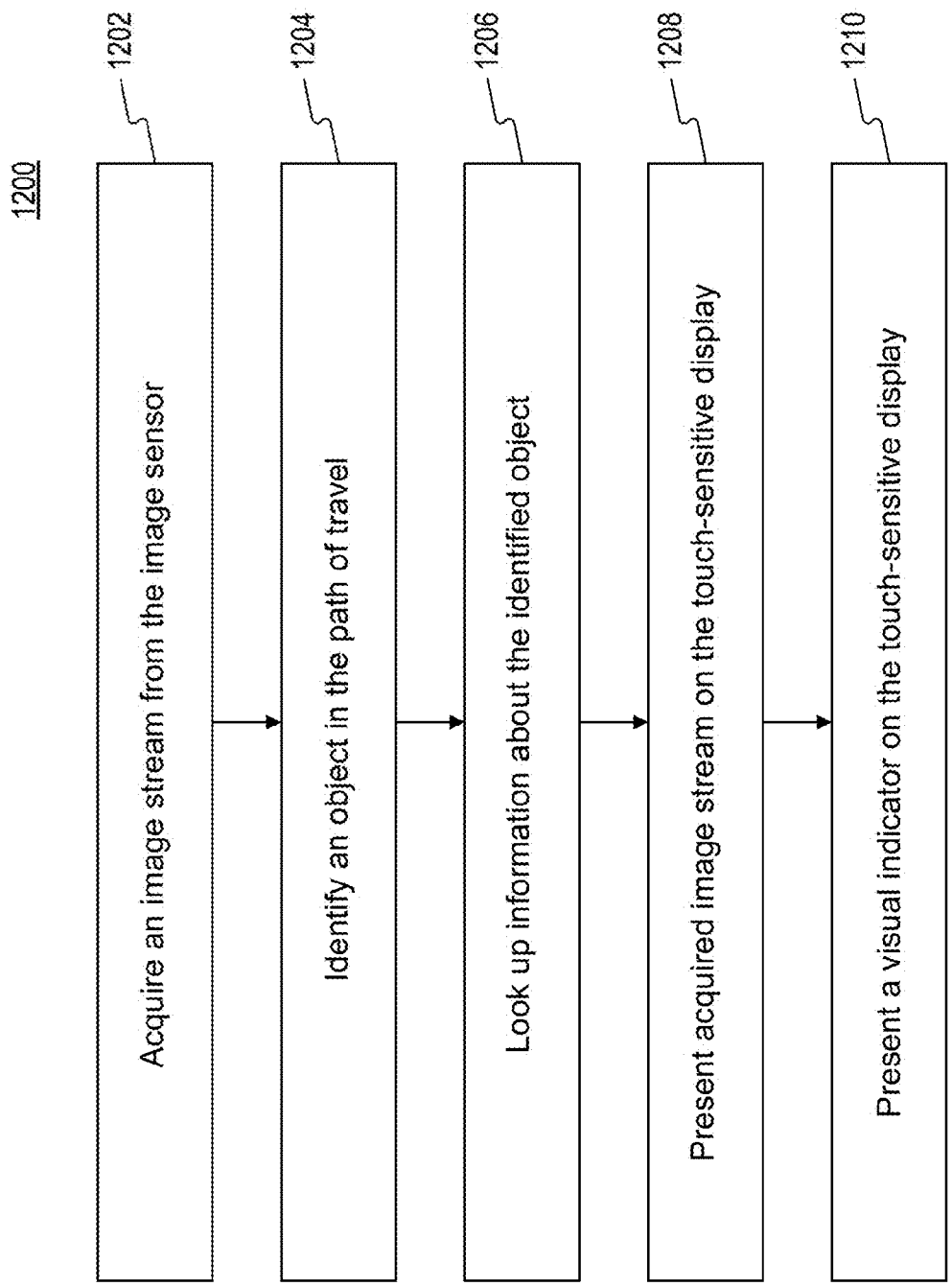
FIGS. 12A, 12B, 12C, and 12D are flowcharts of exemplary methods for providing augmented reality to a user according to disclosed embodiments.

FIG. 12A depicts an exemplary method 1200 for providing augmented reality to user 100, in accordance with example embodiments of the present disclosure. In one embodiment, at least some of the steps of method 1200 may be performed by mobile device 102 illustrated in FIG. 10. In another embodiment, at least some of the steps of method 1200 may be performed by sensor unit 1110 illustrate in FIG. 11. In the following description, reference is made to certain components of FIG. 10 and FIG. 11 for purposes of illustration. It will be appreciated, however, that other implementations are possible and that other components may be utilized to implement the exemplary method.

At step 1202, processing device 1005 (or control circuits 1132) may acquire an image stream along the direction of the path of travel from image sensor 210. At step 1204, processing device 1005 (or image processing circuits 1136) may identify, in the acquired image stream, an object in the path of travel of user 100. The identified object may be, for example, a person, sales establishment, or a bus stop. At step 1206, processing device 1005 (or mobile device circuits 1150) may look-up information about the identified object. In one example, when the identified object is a person, processing device 1005 can look up a person's name in the memory device 1010. In another example, when the identified object is a bus stop, processing device 1005 can look up details about the next bus that is scheduled to arrive. In one embodiment, the step of looking-up information about the identified object, may include transmitting to a remote server an image that includes the identified object, and the remote server retrieves information about the identified object. At step 1208, processing device 1005 (or control circuits 1132) may present on touch-sensitive display 300, in real-time, the acquired image stream including the identified object. At step 1210, processing device 1005 (or control circuits 1132) may present on touch-sensitive display 300, a visual indicator associated with the identified object. For example, when the identified object is a sales establishment, the visual indicators may include the name of the sales establishment and an icon representing the sales products of the sales establishment. In some embodiments, the visual indicator may represent information about a commercial offer, for example, information about an on-going sale at the exemplary sales establishment. The visual indicator may be overlaid on the acquired real-time image stream. For example, the visual indicator representing an on-going sale at the exemplary sales establishment may be overlaid on the past of the real-time image stream corresponding to the sales establishment.

Figure 13A:
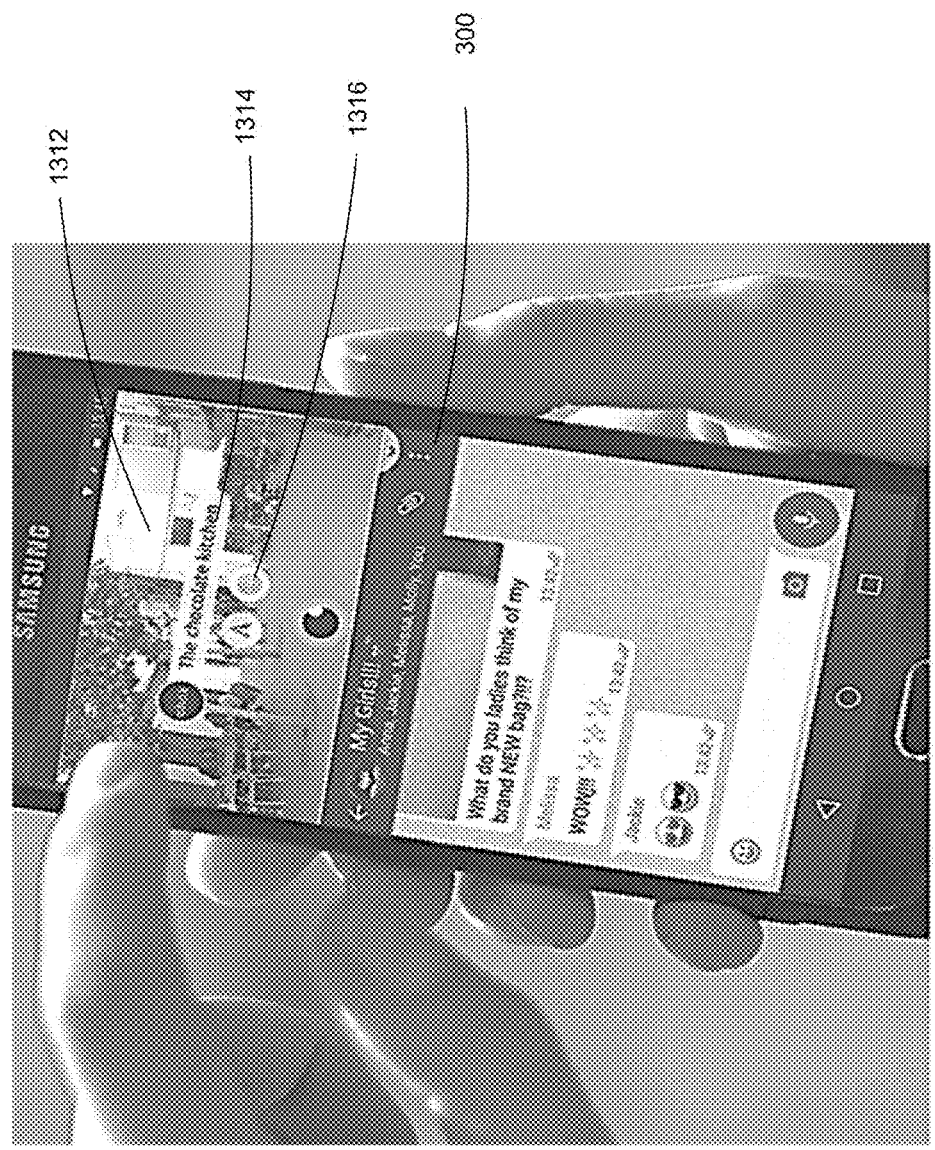
FIGS. 13A, 13B, 13C, 13D, 13E, and 13F are schematic illustrations of example usages of an edge camera assembly according to disclosed embodiments.
Figure 13B:
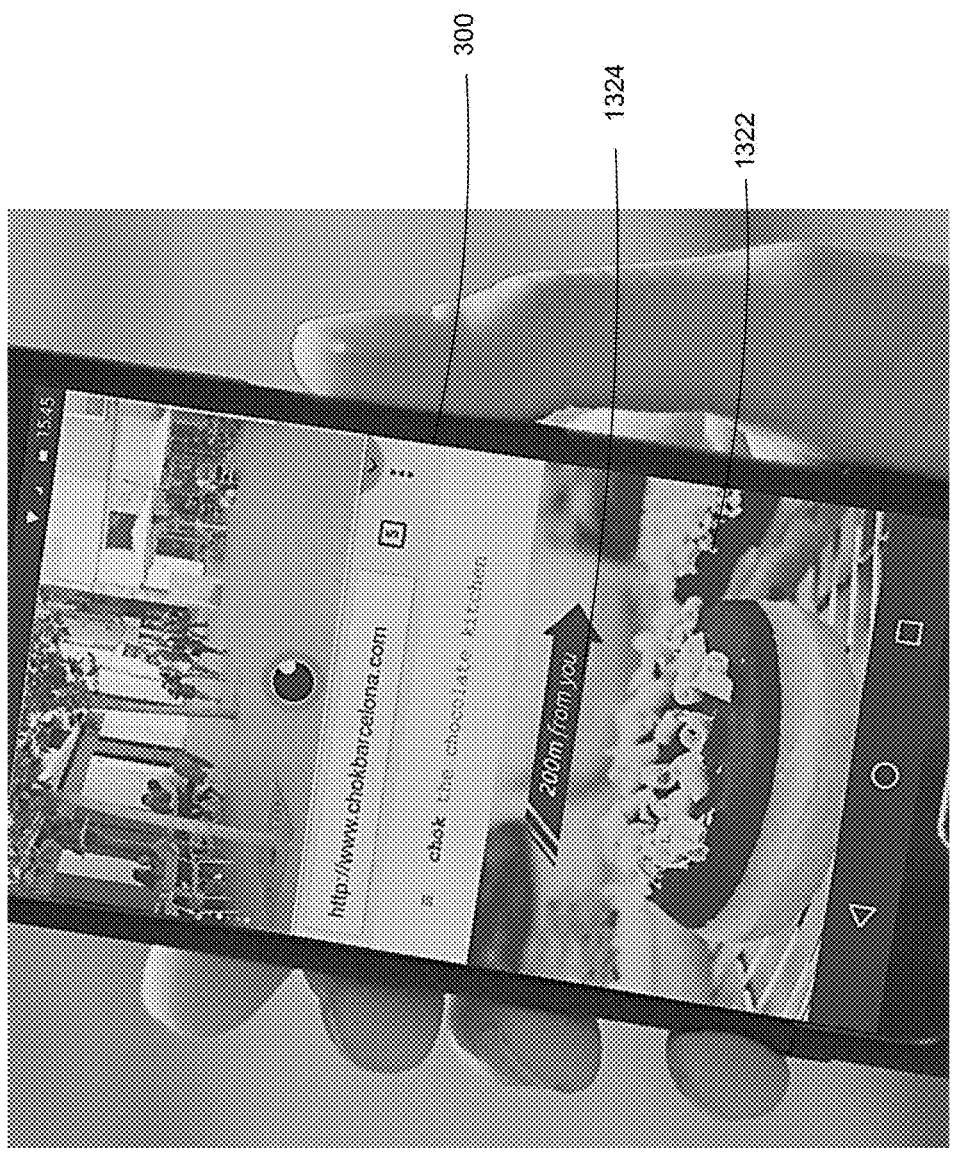
Figure 13C:
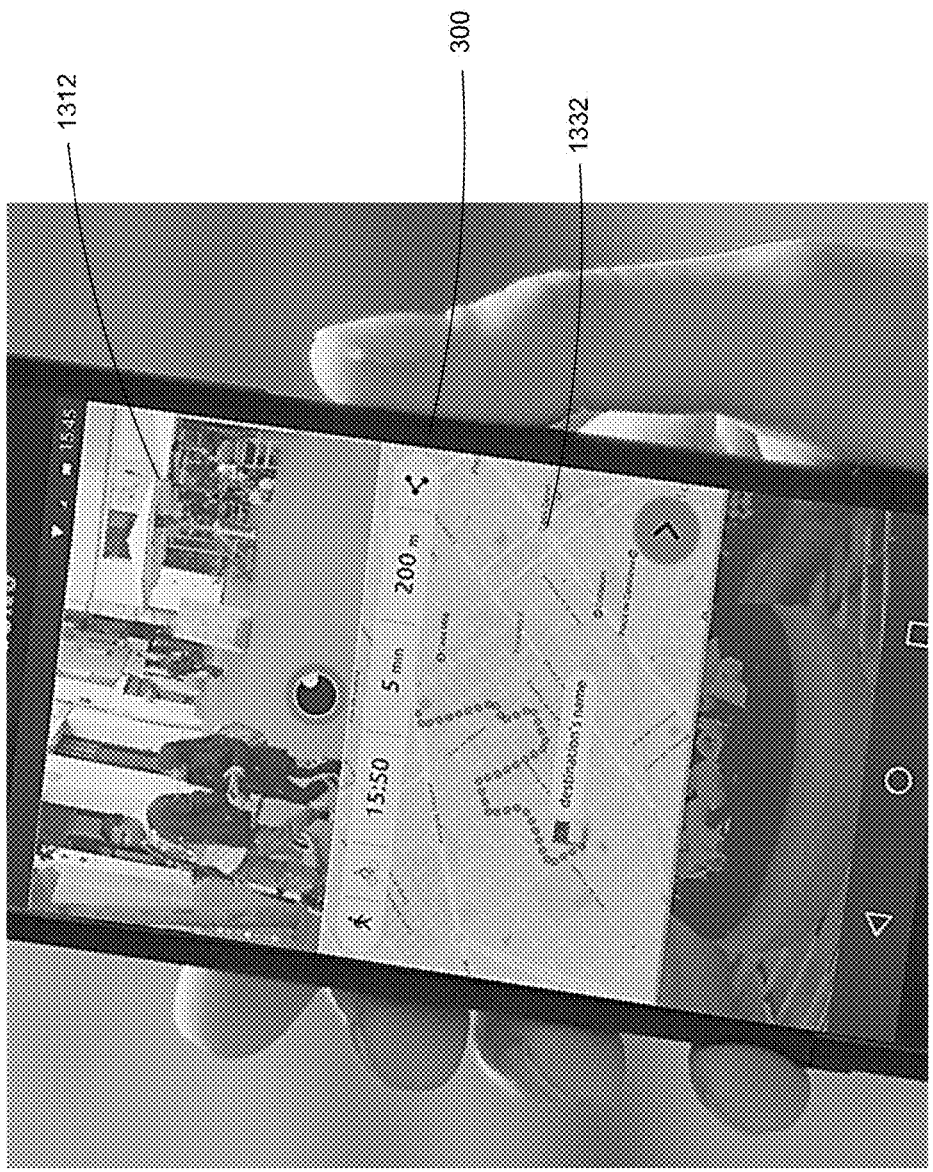

FIG. 13A-13C are schematic illustrations of an example usage of an edge camera assembly according to disclosed embodiments. In FIG. 13A an acquired image stream 1312 is displayed on a touch-sensitive display 300. A visual indicator 1314 (representing the chocolate kitchen in this example) may be overlaid on acquired image stream 1312. Further, the visual indicator may include an indication that more information is available upon interaction with touch-sensitive display 300 (for example, icon 1316). In response to a touch interaction corresponding to icon 1316, further details about the identified object may be displayed on touch-sensitive display 300. For example, further details 1322 are displayed in FIG. 13B in response to touch-interaction with icon 1316. In addition, details 1322 may include an indication that walking guidance is available upon a further interaction with touch-sensitive display 300 (for example, icon 1324). In response to a touch interaction corresponding to icon 1324, a map 1332 (as shown in FIG. 13C) is displayed on interactive user application window 306. In this example, the map may include a route from user 100 location to the chocolate kitchen.

Figure 12B:
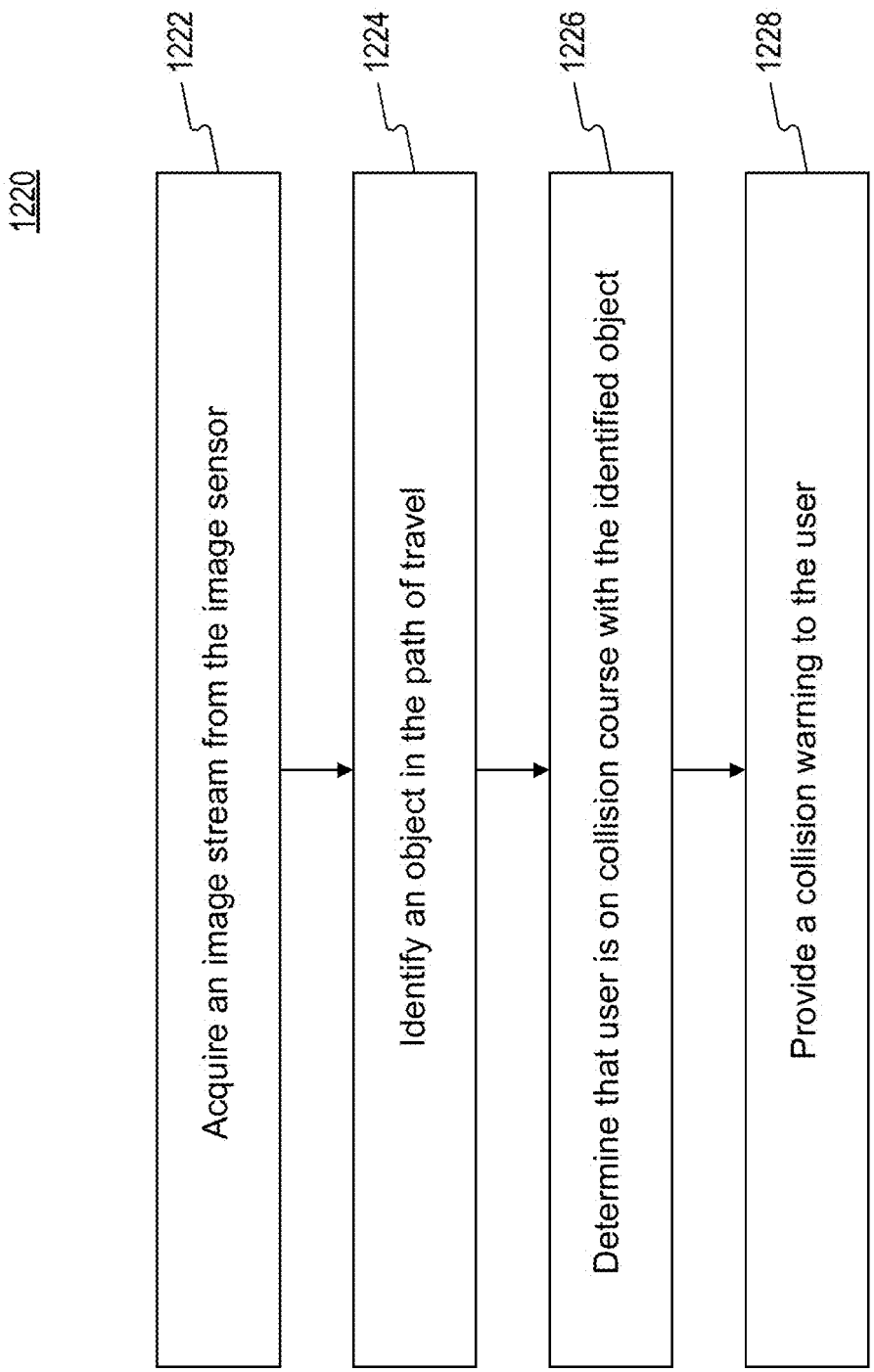

FIG. 12B depicts an exemplary method 1220 for avoiding collision of user 100 with an identified object, in accordance with example embodiments of the present disclosure. In one embodiment, all of the steps of method 1220 may be performed by mobile device 102 illustrated in FIG. 10. In another embodiment, all of the steps of method 1220 may be performed by sensor unit 1110 illustrate in FIG. 11. In the following description, reference is made to certain components of FIG. 10 and FIG. 11 for purposes of illustration. It will be appreciated, however, that other implementations are possible and that other components may be utilized to implement the exemplary method.

At step 1222, processing device 1005 (or control circuits 1132) may acquire an image stream along the direction of the path of travel from image sensor 210. At step 1224, processing device 1005 (or image processing circuits 1136) may identify, in the acquired image stream, an object in the path of travel of user 100. The identified object may be, for example, a lamp post. At step 1226, processing device 1005 (or image processing circuits 1136) may determine whether user 100 is on a collision course with the identified object. As an example, processing device 1005 may determine that user 100 is on a collision course with the lamp post identified in the acquired image stream. At step 1228, processing device 1005 may generate a warning of the collision course. The warning may be provided to user 100 using a visual indicator on touch-sensitive display 300, an audio warning using speaker 1026, a tactile warning using a tactile actuator included in other input/control devices 1030, or a combination of two or more warning systems. In response to the warning, user 100 can take evasive action to avoid collision with the lamp post. In another embodiment, image processing circuits 1136 can determine whether user 100 is on a collision course with the identified object. In response to a determination of a collision, control circuits 1132 may generate a warning of the collision course. The warning may be provided to user 100 using a visual indicator on touch-sensitive display 300, an audio warning using speaker 1026, a tactile warning using tactile actuators 1142, or a combination of two or more warning systems.

Figure 13D:
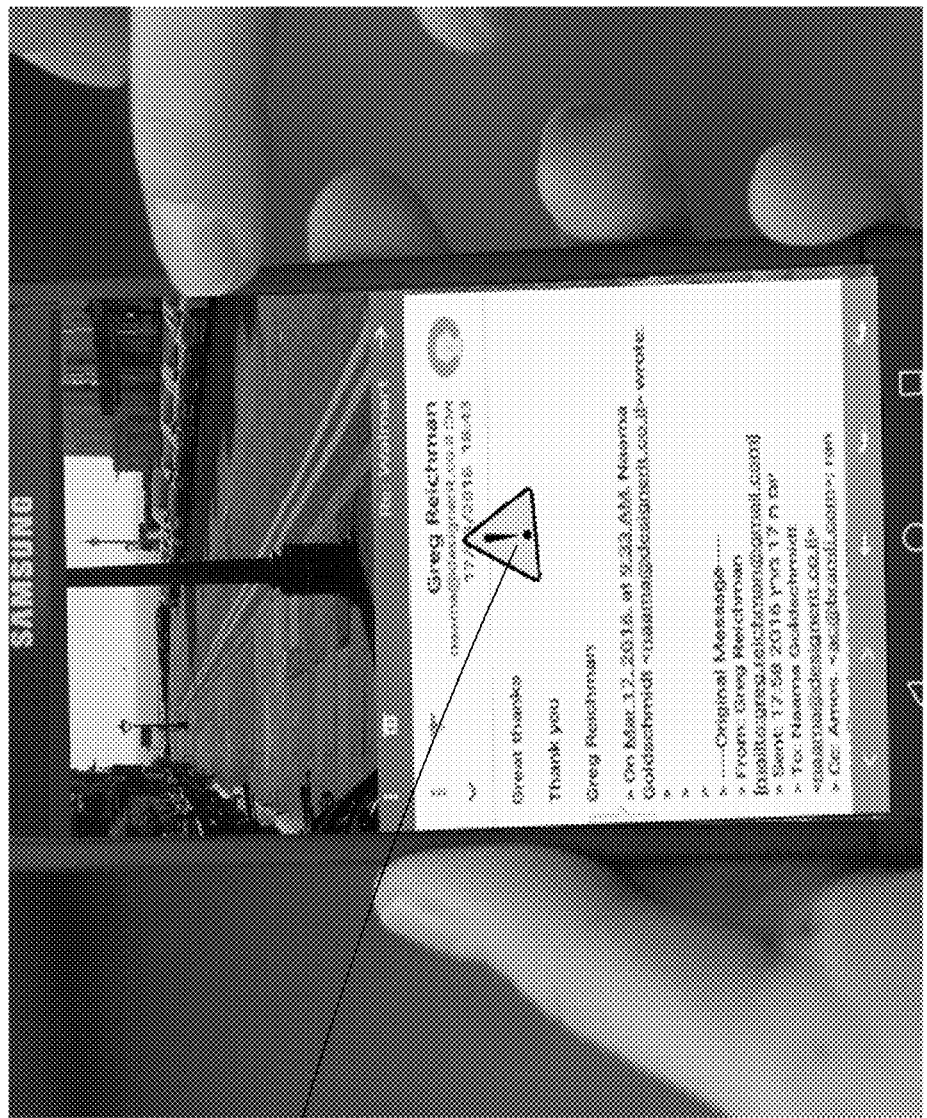

FIG. 13D is a schematic illustration of an example usage of an edge camera assembly according to disclosed embodiments. In FIG. 13D an acquired image stream 1312 is displayed on a touch-sensitive display 300. In this example, visual indicator 1342 is a warning that user 100 is on a collision course with the lamp post. As depicted, the visual indicator 1342 may be displayed on interactive user application window 306 to make sure that user 100 notices the warning.

Figure 12C:
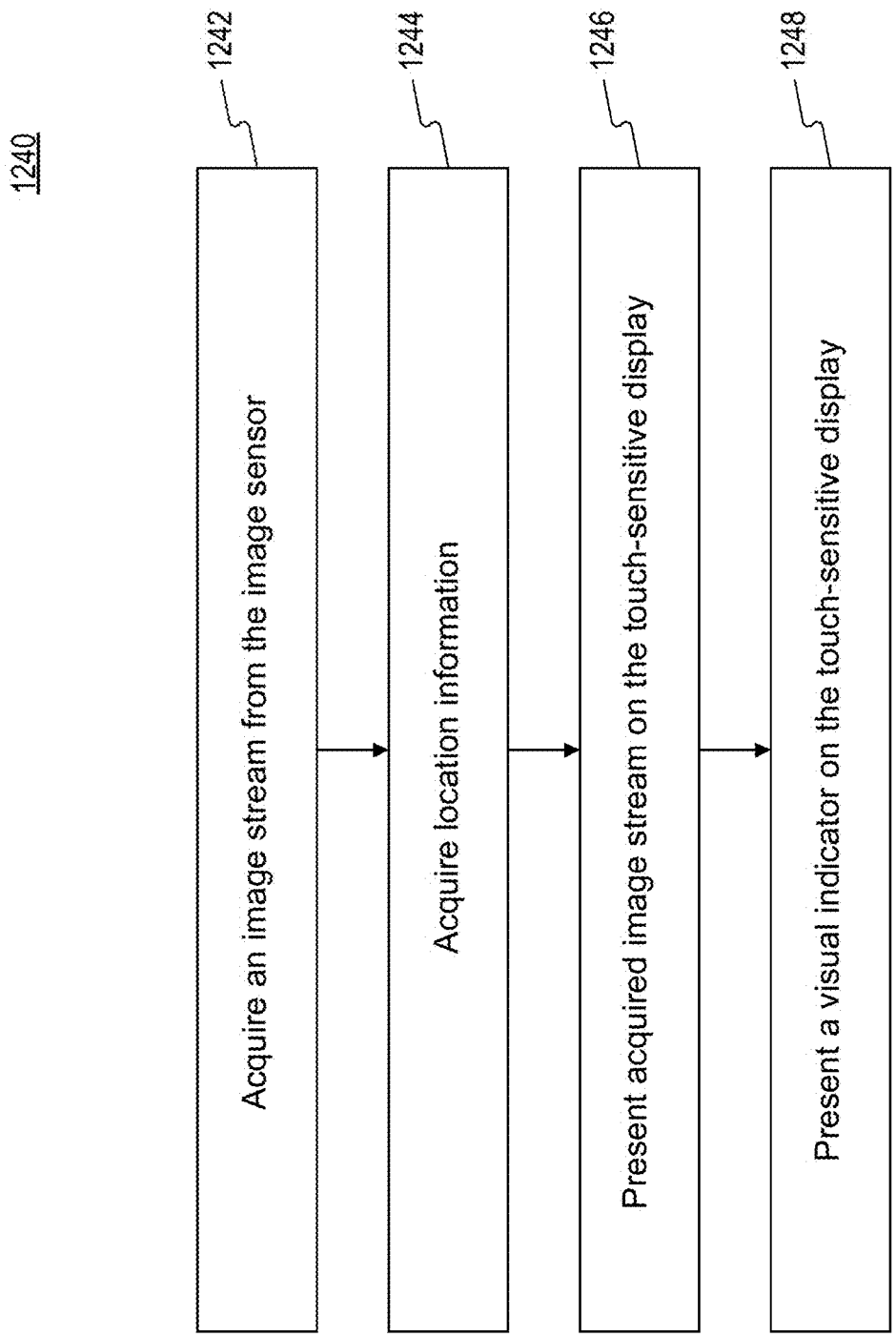

FIG. 12C depicts an exemplary method 1240 for providing augmented reality to user 100, in accordance with example embodiments of the present disclosure. In one embodiment, all of the steps of method 1240 may be performed by mobile device 102 illustrated in FIG. 10. In another embodiment, all of the steps of method 1240 may be performed by sensor unit 1110 illustrate in FIG. 11. In the following description, reference is made to certain components of FIG. 10 and FIG. 11 for purposes of illustration. It will be appreciated, however, that other implementations are possible and that other components may be utilized to implement the exemplary method. At step 1242, processing device 1005 (or control circuits 1132) may acquire an image stream along the direction of the path of travel from image sensor 210. At step 1244, processing device 1005 (or control circuits 1132) may acquire location information from positioning system 1014 (or location based service circuits 1134). As an example, the location information may include location information of user 100, location information associated with a route of travel to a destination. At step 1246, processing device 1005 (control circuits 1132) may present on touch-sensitive display 300, in real-time, the acquired image stream. At step 1248, processing device 1005 (or control circuits 1132) may present on touch-sensitive display 300, a visual indicator simultaneously with the display of the real-time image stream. In one example, the visual indicator in this embodiment may be associated with turn-by-turn directions. In another example, the visual indicator in this embodiment may be associated with a place located in proximity to user 100.

Figure 13E:
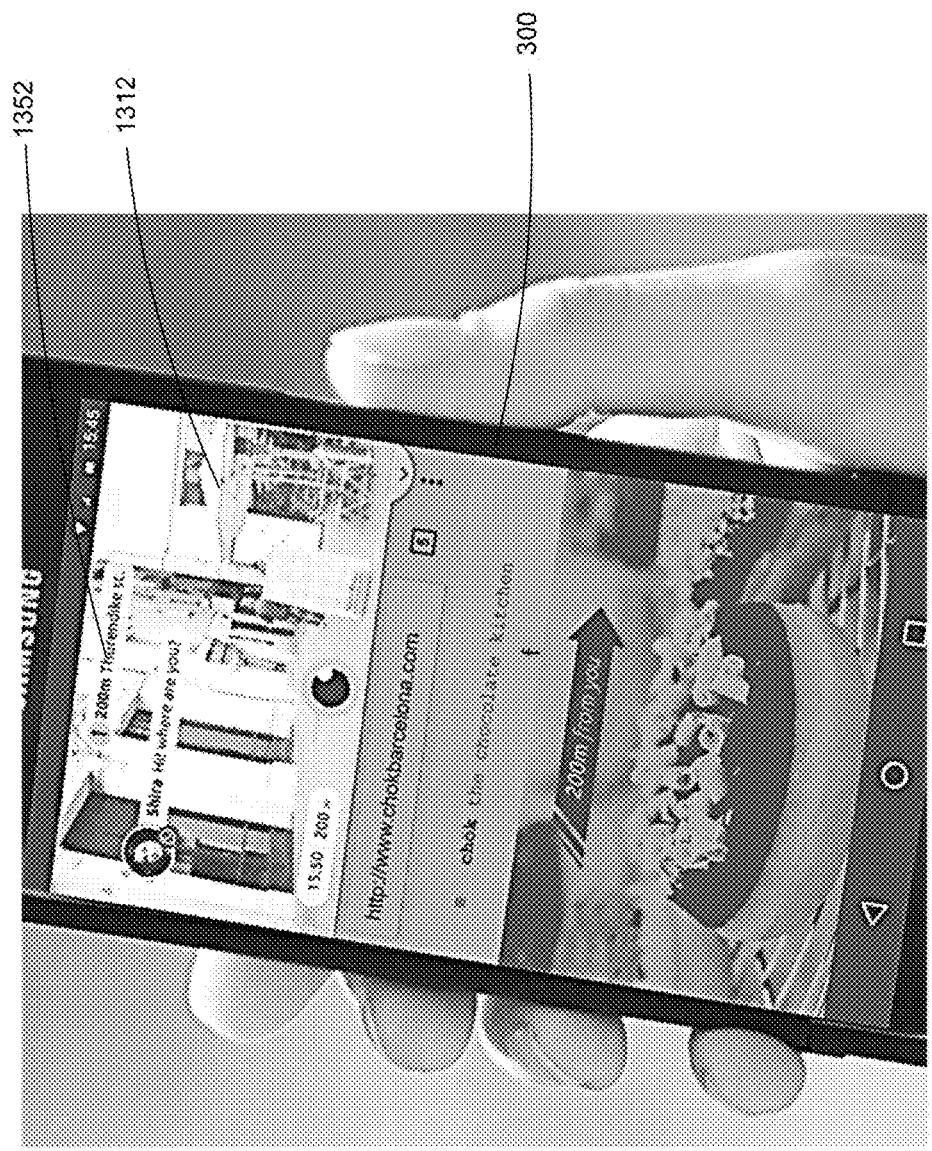
Figure 13F:

FIG. 13E is a schematic illustration of an example usage of an edge camera assembly according to disclosed embodiments. An acquired image stream 1312 is displayed on one part of a touch-sensitive display 300. Further, a visual indicator 1352, representing turn-by-turn directions to a destination is overlaid on top of acquired image stream 1312.

Figure 12D:
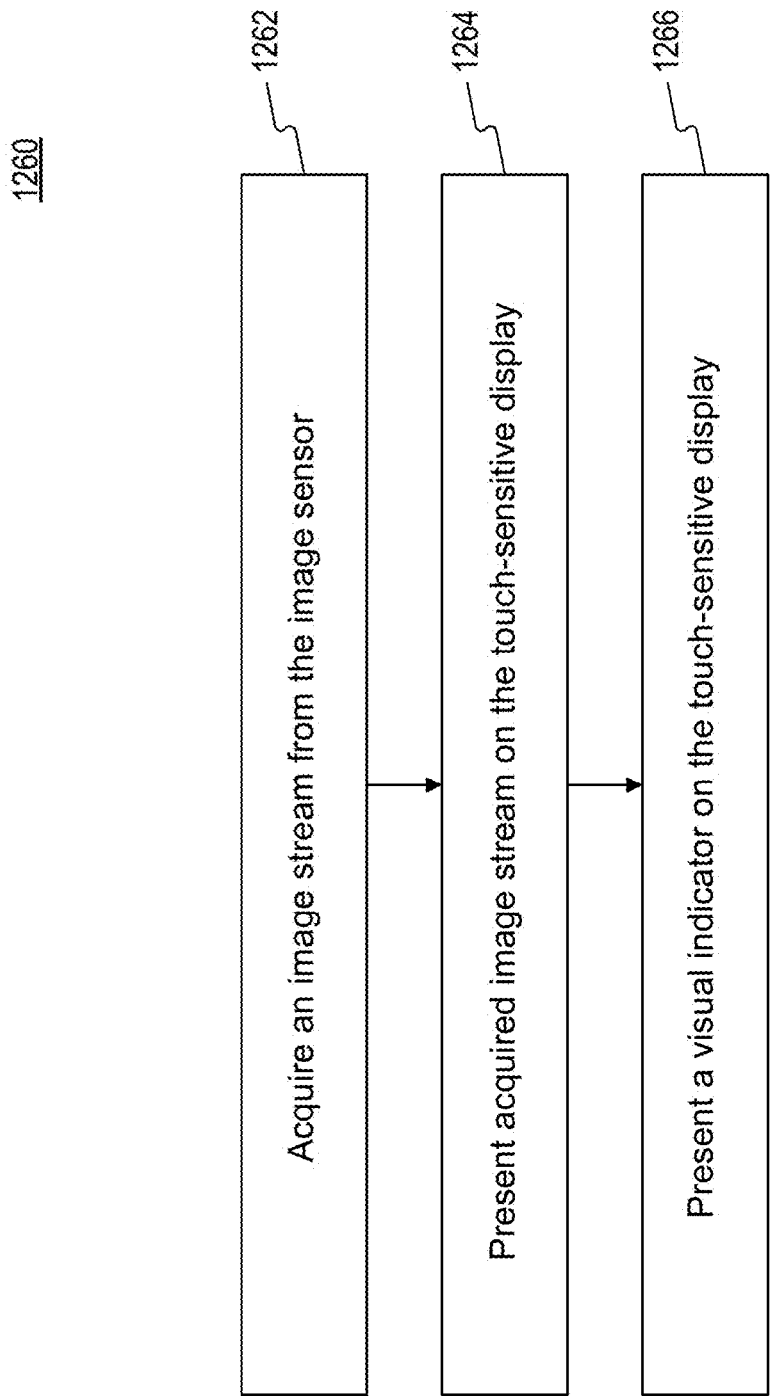

FIG. 12D depicts an exemplary method 1260 for providing augmented reality to user 100, in accordance with example embodiments of the present disclosure. Method 1260 may be used, for example, in a game providing augmented reality by combining an acquired image stream with game graphics. In one embodiment, all of the steps of method 1260 may be performed by mobile device 102 illustrated in FIG. 10. In another embodiment, all of the steps of method 1260 may be performed sensor unit 1110 illustrate in FIG. 11. In the following description, reference is made to certain components of FIG. 10 and FIG. 11 for purposes of illustration. It will be appreciated, however, that other implementations are possible and that other components may be utilized to implement the exemplary method. At step 1262, processing device 1005 (or control circuits 1132) may acquire an image stream along the direction of the path of travel from image sensor 210. At step 1264, processing device 1005 (or control circuits 1132) may present on touch-sensitive display 300, in real-time, the acquired image stream. At step 1266, processing device 1005 (or control circuits 1132) may present on touch-sensitive display 300, a visual indicator. In an exemplary game, the visual indicator may be a game character overlaid on top of the acquired image stream.

FIG. 13E is a schematic illustration of an example usage of an edge camera assembly according to disclosed embodiments. An acquired image stream 1312 is displayed on one part of a touch-sensitive display 300. Further, a visual indicator 1362, representing a game character is overlaid on top of acquired image stream 1312. The game character may or may not be associated with the application displayed on interactive user application window 306.

Figure 14:
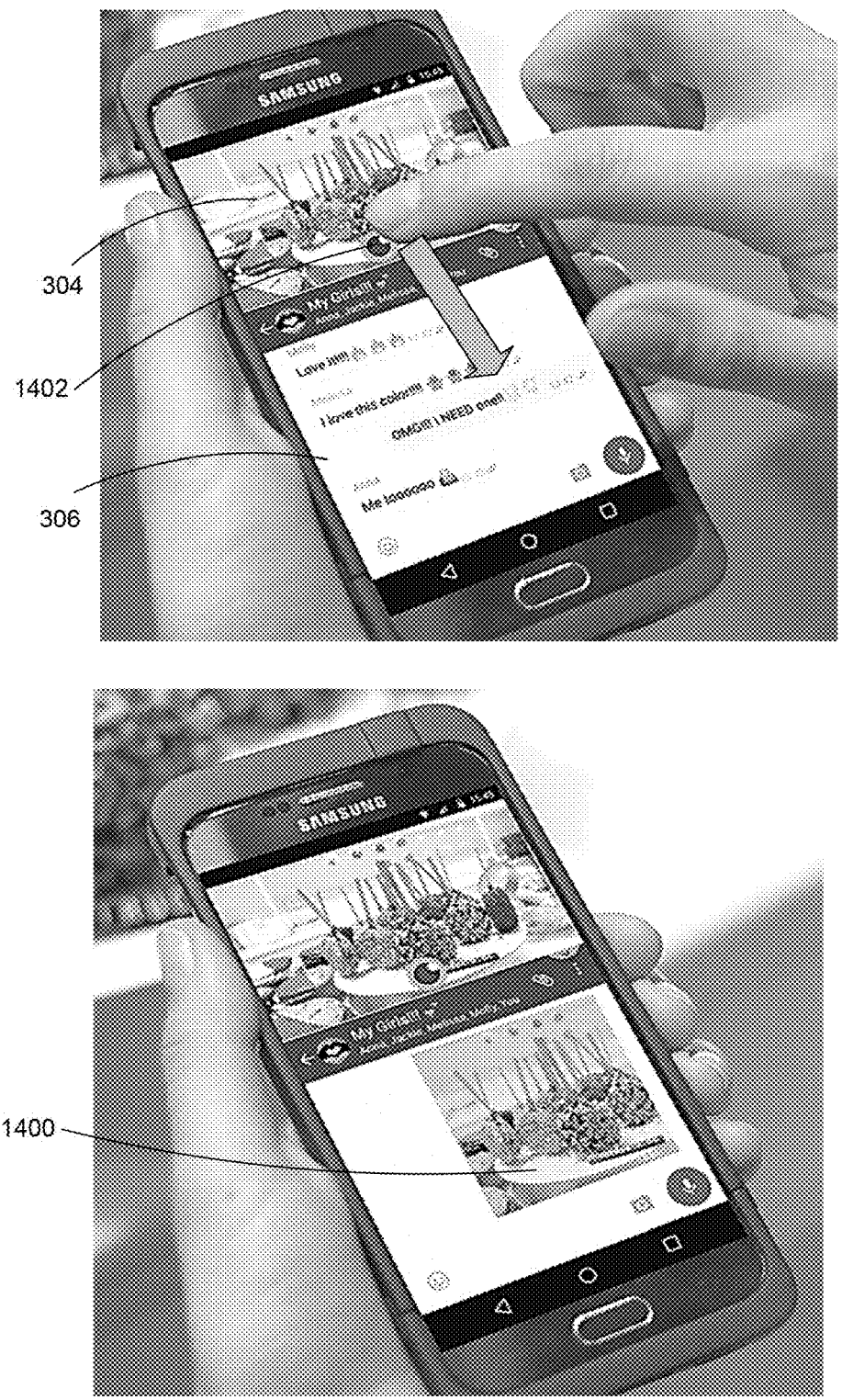
FIG. 14 is a schematic illustration of an example usage of an edge camera assembly according to disclosed embodiments.

FIG. 14 is a schematic illustration of an example usage of an edge camera assembly according to disclosed embodiments. In this example, the edge camera assembly enables "dragging and dropping" images to an ongoing application. Specifically, the edge camera assembly may be associated with a computer-readable medium configured for use in mobile device 102. The computer-readable medium contains instructions that when executed by processing device 1005 cause processing device 1005 to perform steps including: receiving from at least one image sensor 210 a real-time image stream from an environment of user 100 as user 100 moves along a travel path; presenting on touch-sensitive display 300 the real-time image stream; and presenting on touch-sensitive display 300 simultaneously with the real-time image stream, an interactive user application. For example, mobile device 102 may present real-time image streaming window 304 simultaneously with interactive user application window 306. The steps of this embodiment further include: enabling user 100 using touch-sensitive display 300 to touch a region associated with the real-time image stream, and cause at least one frame 1400 of the real-time image stream to be transferred to the interactive user application; and executing an action in the interactive user application that involves the at least one frame 1400.

In related embodiments, the interactive user application may be a messaging application and the instructions further include sending a message to a remote recipient, wherein the message includes at least one frame 1400. In one embodiment, at least one frame 1400 may be a single frame captured by at least one image sensor 210, e.g., an image. In another embodiment, at least one frame 1400 may be multiple frames captured, e.g., a live video stream captured by at least one image sensor 210. In a suggested implementation of this embodiment, the touch may include pressing GUI feature 1402 to select at least one frame 1400 following by a drag and drop motion from the region associated with the real-time stream (e.g., image streaming window 304) to a region associated with the interactive user application (e.g., interactive user application window 306). In addition, the instructions may further include buffering the real-time stream and enabling user 100 to interact with touch-sensitive display 300 in a manner permitting a buffered portion of the real-time image stream to be transmitted via the messaging application.

Figure 15:
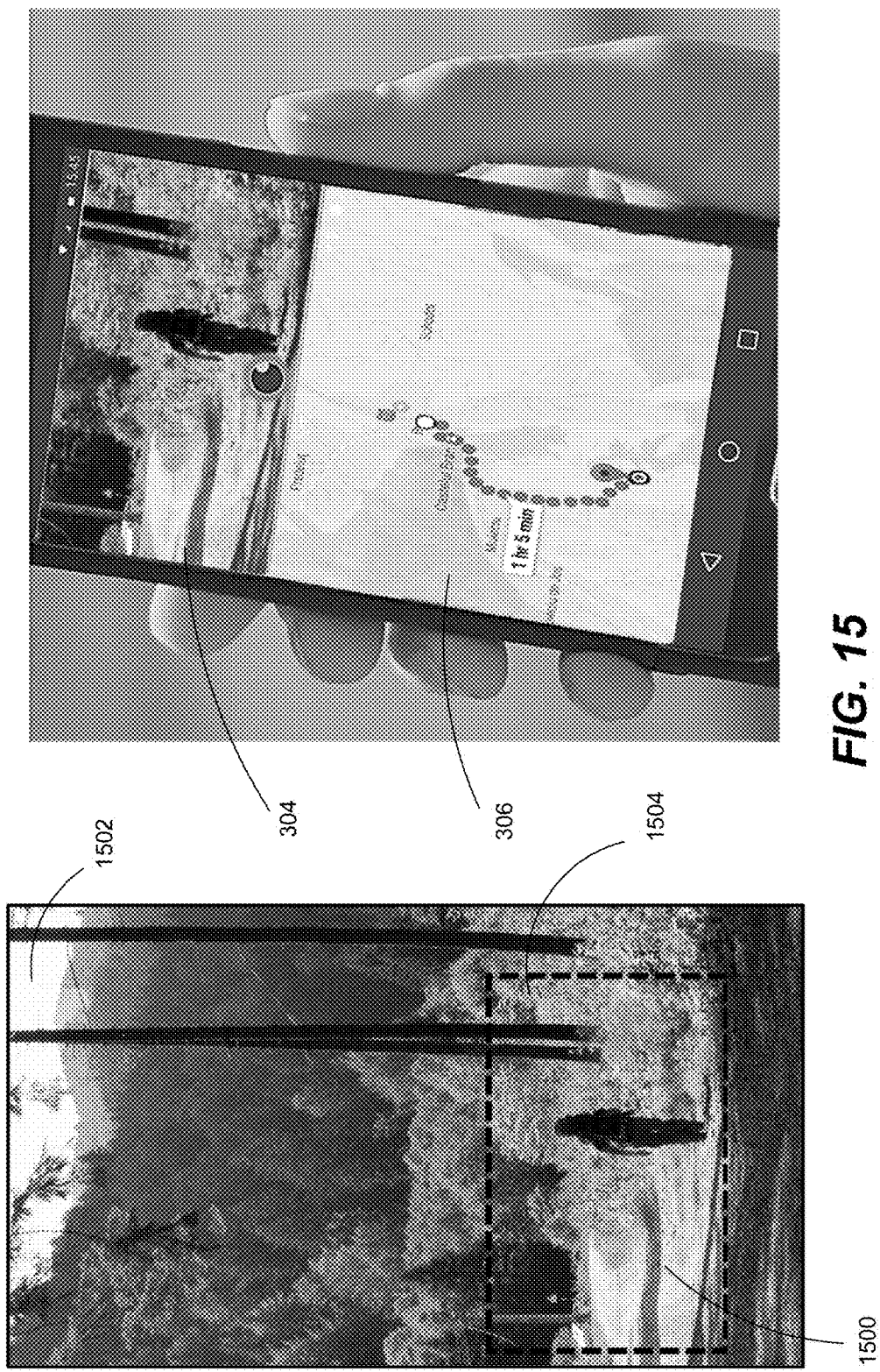
FIG. 15 is a schematic illustration of another example usage of an edge camera assembly according to disclosed embodiments.

FIG. 15 is a schematic illustration of another example usage of an edge camera assembly according to disclosed embodiments. Since the holding orientation of mobile device 102 can vary from person to person, the relevant portion of field of view of each user also changes. Therefore, in another embodiment of the disclosure, a method is presented for providing an adjustable window that corrects for the angular orientation of mobile device 102 to enable images of the immediate path of user 100 to be presented on touch-sensitive display 300. The adjustable window also enables user 100 the freedom to select the field of view to see in real-time image streaming window 304. For example, using pinch gestures on real-time image streaming window 304 or using a specific GUI feature, user 100 can select the image data to be presented. The selection of the image data may be considered as cropping the received image data. Specifically, the edge camera assembly may be associated with a computer-readable medium configured for use in mobile device 102. The computer-readable medium contains instructions that when executed by processing device 1005 cause processing device 1005 to perform steps including receiving from at least one image sensor 210 image data representing an environment of user 100 as user 100 moves along a travel path 1500. Image 1502 is an example of the image data received from image sensor 210.

The steps may further include selecting a field of view window 1504 from the image data for real-time display on mobile device 102. The selection of the field of view window 1504 may be executed manually by user 100 by detecting user input from a control permitting the user to select the field of view window. Alternatively, the selection may include detecting an angular orientation of mobile device 102 and automatically adjusting field of view window 1504 based on the angular orientation. In addition, the selection may include detecting a movement pattern of mobile device 102 as user 100 moves along travel path 1500 and automatically adjusting field of view window 1504 to compensate for movements of mobile device 102. In one example, selected field of view window 1504 may correspond to travel path 1500. The steps may further include presenting on touch-sensitive display 300 simultaneously with interactive user application window 306, selected field of view window 1504, and omitting from presentation on touch-sensitive display 300 image data outside the field of view window. Consistent with present disclosure, the instructions may further include adjusting field of view window 1504 in real-time.

Figure 16:
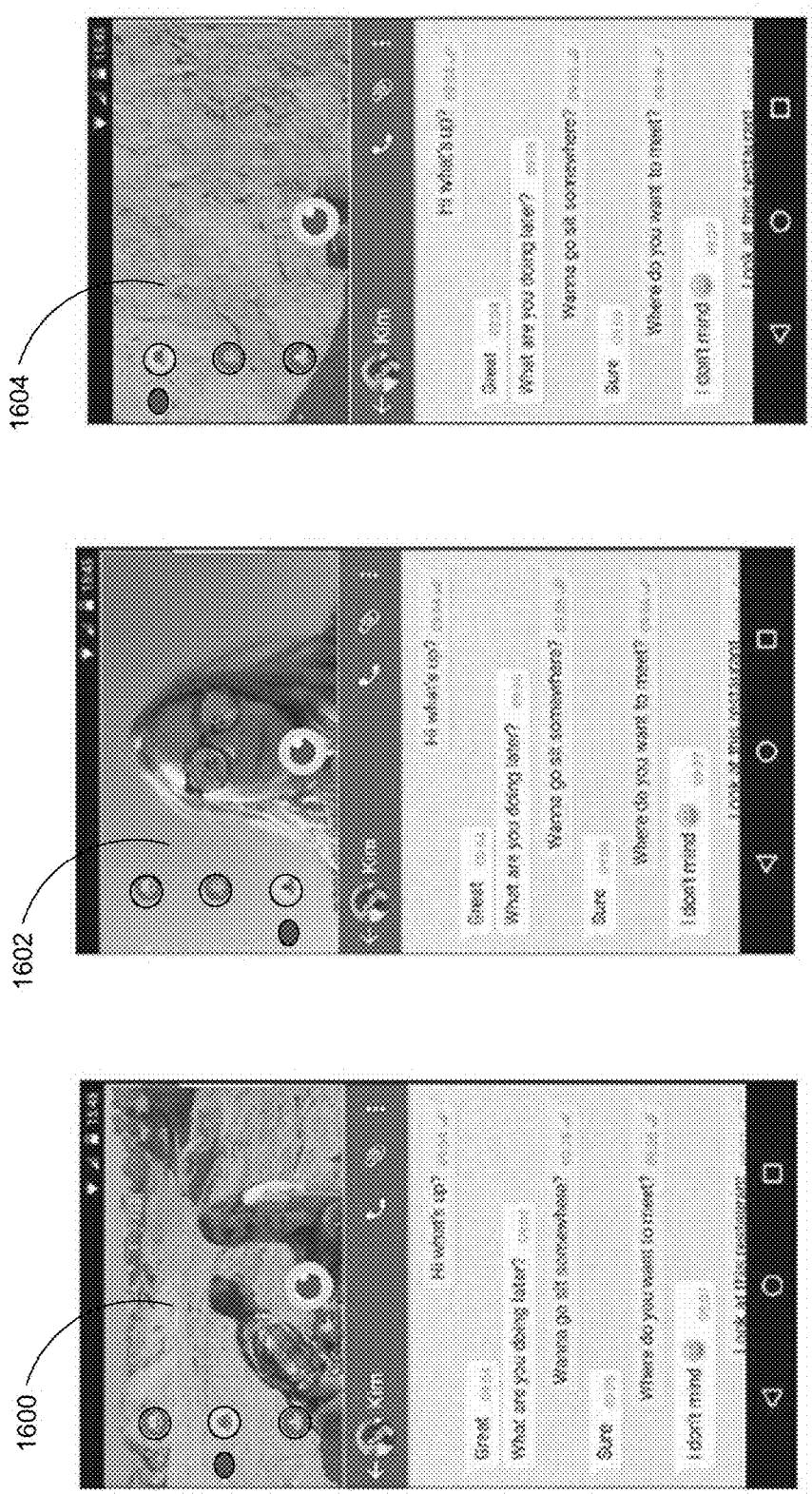
FIG. 16 is a schematic illustration of another example usage of an edge camera assembly according to disclosed embodiments.

FIG. 16 is a schematic illustration of another example usage of an edge camera assembly according to disclosed embodiments. In this example, the edge camera assembly enables mobile device 102 to switch between three (or more) camera inputs using a simple gesture. Specifically, the edge camera assembly may include one or more image sensors 210 and may be associated with a computer-readable medium configured for use in mobile device 102. The computer-readable medium contains instructions that when executed by processing device 1005 cause processing device 1005 to perform steps including: receiving a first real-time image stream 1600 from a first image sensor (e.g., image sensor 210) having a first optical axis (e.g., optical axis 600) extending in a first direction; receiving a second real-time image stream 1602 from a second image sensor (e.g., first additional image sensor 310) having a second optical axis (e.g., optical axis 700) extending in a second direction that differs from the first direction; and receiving a third real-time image stream 1604 from a third image sensor (e.g., second additional image sensor 312) having a third optical axis (e.g., optical axis 702) extending in a third direction that differs from the first and second directions. In the discussion above, the method includes receiving image data from all three image sensors 210 associated with mobile device 102; however, one skilled in the art would recognize that this embodiment will work with less cameras.

The steps further include: determining a field of view window from first real-time image stream 1602 for display on mobile device 102; presenting on touch-sensitive display 300 a real-time presentation that corresponds with the determined field of view window (e.g., selected field of view window 1504); and making an adjustment to field of view window 1504 in response to a user's interaction with touch-sensitive display 300, wherein the adjustment includes at least one of: selecting a new field of view window 1504 from first real-time image stream 1600; selecting a new field of view window 1504 from the second real-time image stream 1602; and selecting a new field of view window 1504 from the third real-time image stream 1604. In one embodiment, the adjustment to field of view window 1504 includes a continuous motion on the display. The continuous motion may be along two distinct directions, wherein a first movement along a first direction changes the field of view window of a real-time image stream and a second movement along a second direction changes the source of real-time image stream.

Figure 17:
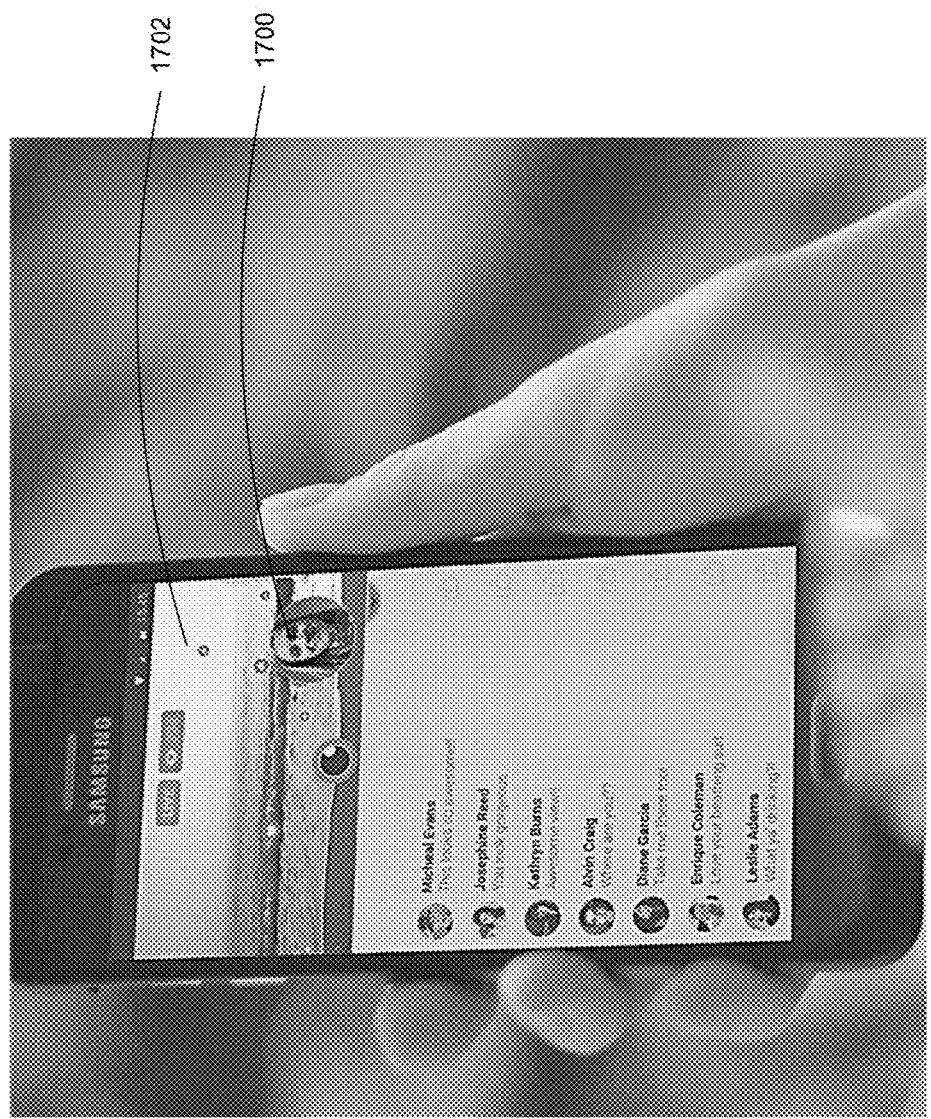
FIG. 17 is a schematic illustration of another example usage of an edge camera assembly according to disclosed embodiments.

FIG. 17 is a schematic illustration of another example usage of an edge camera assembly according to disclosed embodiments. In this example, the edge camera assembly enables mobile device 102 to present, store, and/or share bidirectional image data that is captured along transverse optical axes. For example, a video of the environment in front of user 100 may be captured simultaneously with images of the user's face. Specifically, the edge camera assembly may be associated with mobile device 102 for displaying bidirectional video streams captured along transverse axes. Mobile device 102 may include housing 200 having an upper surface 202, a lower surface 204, and a side edge (e.g., edge surface 206). Mobile device 102 may further include touch-sensitive display 300 located in upper surface 202, a first image sensor (e.g., first additional image sensor 310) having a first optical axis extending in a first direction away from upper surface 202 in a manner configured to capture a face of user 100 when the mobile device 102 is held in the hand of user 100 viewing touch-sensitive display 300. The mobile device may also include a second image sensor (e.g., image sensor 210) at least partially embedded in the side edge and having a second optical axis extending in a second direction away from the side edge in a manner configured to capture a travel path 1500 of user 100 when mobile device 102 is held in the hand of user 100 viewing touch-sensitive display 300, and wherein the first direction is transverse to the second direction. Mobile device 102 may also include at least one processor (e.g., processing device 1005 programmed to: acquire a first real-time image stream from the first image sensor of the face of user 100; acquire a second real-time image stream from the second image sensor of travel path 1500; and present in real-time on touch-sensitive display 300, a bidirectional presentation of the face of user 100 and travel path 1500.

In related embodiments, the bidirectional presentation may include a first window 1700 for the first image stream and a second window 1702 for the second image stream. Further to the discussion above regarding real-time image streaming window 304, at least one of first window 1700 and second window 1702 may be resizable via touch interaction with the touch-sensitive display 300. For example, second window 1702 may be about 15%, 30%, or 50% of touch-sensitive display 300. In addition, a position of at least one of first window 1700 and the second window 1702 is movable via touch interaction with the touch-sensitive display. In other related embodiments, the at least one processor may store the bidirectional presentation for a defined period of time, wirelessly communicate a real-time bidirectional presentation to a remote recipient, wirelessly upload a real-time bidirectional presentation to a server, and/or cause the bidirectional presentation to be transferred to an interactive user application. In addition, the at least one processor may transfer the bidirectional presentation upon identifying a drag and drop motion from a region associated with bidirectional presentation to a region associated with the interactive user application.

Figure 18:
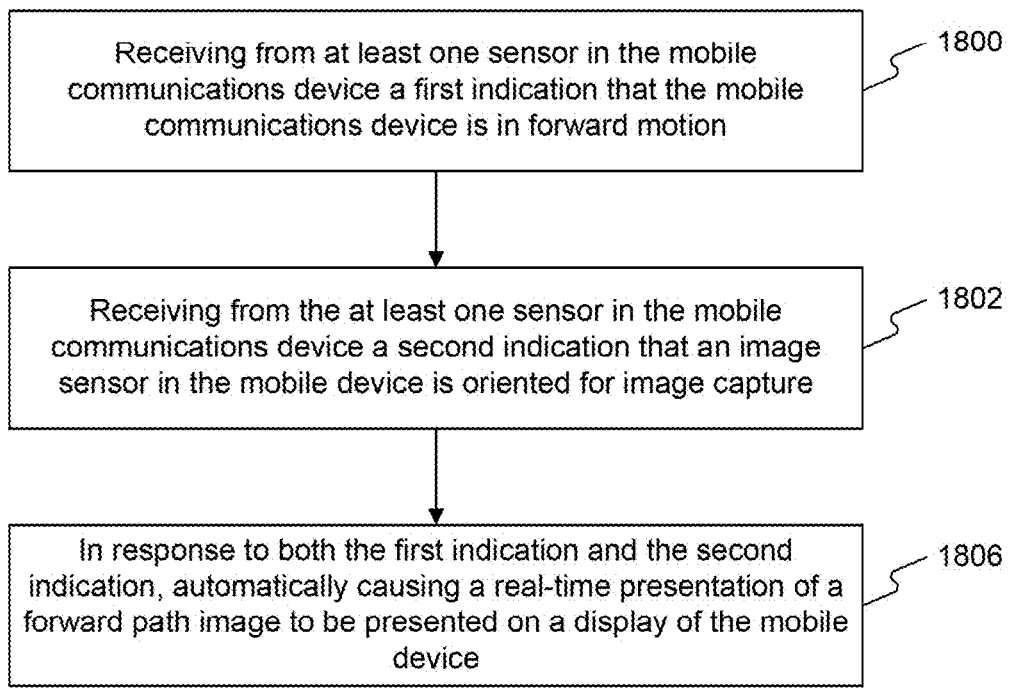
FIG. 18 is a schematic illustration of another example usage of an edge camera assembly according to disclosed embodiments.

FIG. 18 is a schematic illustration of another example usage of an edge camera assembly according to disclosed embodiments. In this example, a method is provided for self-activating the edge camera assembly. For example, when processing device 1005 receives a signal that mobile device 102 is moving forward in an appropriate orientation (such as at a tilt angle indicative of holding), processing device 1005 may automatically activate the edge camera assembly and cause image data to appear on touch-sensitive display 300. Specifically, the edge camera assembly may be associated with a computer-readable medium configured for use in mobile device 102. The computer-readable medium contains instructions that when executed by processing device 1005 cause processing device 1005 to perform the following steps. Step 1800 includes receiving from at least one sensor in mobile device 102 a first indication that mobile device 102 is in forward motion. In one embodiment, the at least one sensor may include an accelerometer, and the first indication includes a measure relating to acceleration. For example, the first indication is a velocity of between about 1 km/h and 35 km/h identified for more than a predetermined period of time. Step 1804 includes receiving from the at least one sensor in mobile device 102 a second indication that an image sensor in mobile device 102 is oriented for image capture (e.g., image sensor 210). In one embodiment, the at least one sensor includes a sensor that detects tilt wherein the second indication corresponds to a tilt angle of mobile device 102. For example, the tilt angle may be between about 0° and about 45° relative to a surface on which a user of the mobile communications device walks. Alternatively, the at least one sensor may include a proximity sensor, wherein the second indication is reflective of whether at least one image sensor 210 is unobstructed. In step 1806 and in response to both the first indication and the second indication, the method includes automatically causing a real-time presentation of a forward path image to be presented on touch-sensitive display 300.

In related embodiments, the instructions are configured to cause automatic capture when a velocity of mobile device 102 is detected to exceed a predetermined threshold, when a tilt angle of mobile device 102 is within a predetermined range, when a velocity of mobile device 102 is detected to fall beneath a predetermined threshold, and/or when a velocity of mobile device 102 is detected to exceed a predetermined threshold. In addition, the instructions are configured to allow user 100 to select predetermined thresholds for image capture, the predetermined thresholds including at least one of velocity and the orientation of mobile device 142. In one embodiment, the instructions further include detecting whether touch-sensitive display 300 is active, and automatically causing the real-time presentation of the forward path image to be presented on touch-sensitive display 300 in response to a combination of a detection of an active display and in response to both the first indication and the second indication. In another embodiment, the instructions further include determining whether a battery status of mobile device 102 is higher than a predefined threshold, and automatically causing the real-time presentation of the forward path image to be presented on touch-sensitive display 300 in response to a combination of a determination that the battery status is higher than the predefined threshold and in response to both the first indication and the second indication.

Figure 19:
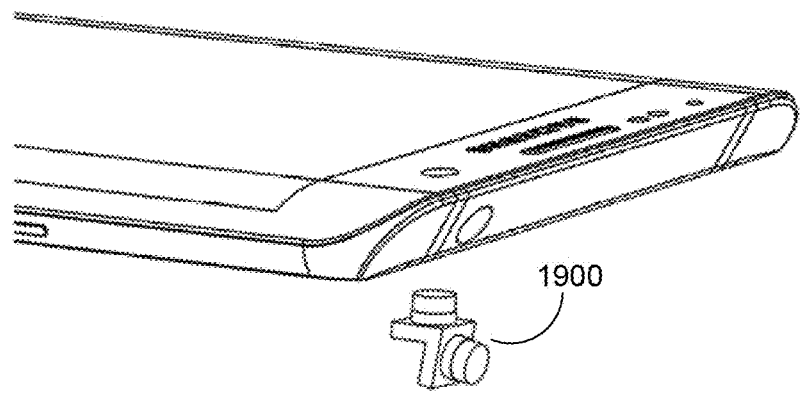
FIG. 19 is a schematic illustration of another example usage of an edge camera assembly according to disclosed embodiments.

FIG. 19 is a schematic illustration of another example usage of an edge camera assembly according to disclosed embodiments. In this example, the edge camera assembly is incorporated in the casing of mobile device 102, such that one image sensor may be used to capture image data from two directions. As illustrated in FIG. 19, the multi-directional camera may be embedded in the bezel of a mobile device 102. Specifically, in this embodiment an image capture casing is provided. The image capture casing may include an upward facing display surface (e.g., touch-sensitive display 300) and an opposing lower surface (e.g., lower surface 204). The image capture casing may include housing 200 for surrounding at least a portion of mobile device 102, image sensor 210, and circuitry for conveying from image sensor 210, image data for real-time display on the display surface. In this embodiment, image sensor 210 may be mounted in housing 200 and have a first optical axis extending in a first direction and second optical axis extending in a second direction that differs from the first direction, wherein the first optical axis is configured to be oriented at a fixed obtuse angle with respect to the lower surface when mobile device 102 is retained by housing 200. Consistent with this embodiment, image sensor 210 may be associated with an optical apparatus 1900 embedded in housing 200 to enable image sensor 210 to capture image data in a first direction extending from the peripheral edge and in a second direction extending from the upward facing display surface. In a first configuration the angle between the first optical axis and the second optical axis may be obtuse. In a second configuration the angle between the first optical axis and the second optical axis may be acute. Examples of the angles are discussed above with reference to FIGS. 6-9.

Figure 20:
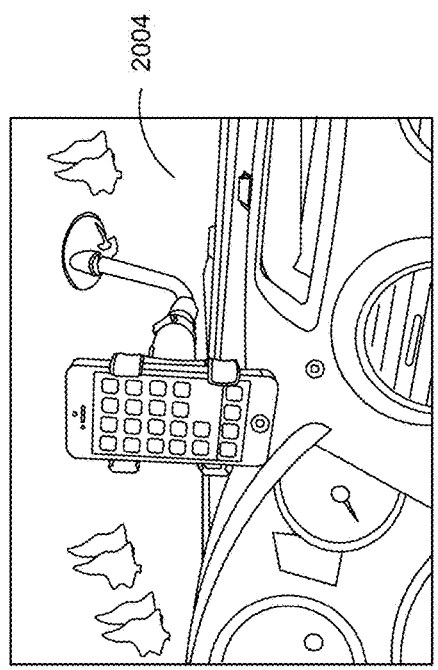
FIG. 20 is a schematic illustration of another example usage of an edge camera assembly according to disclosed embodiments.
Figure 20:
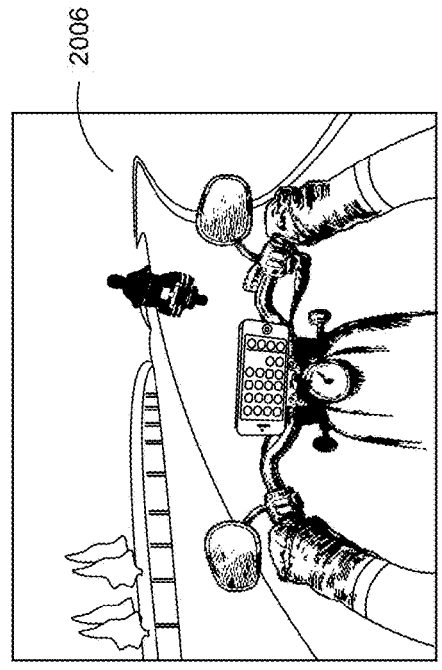
Figure 20:
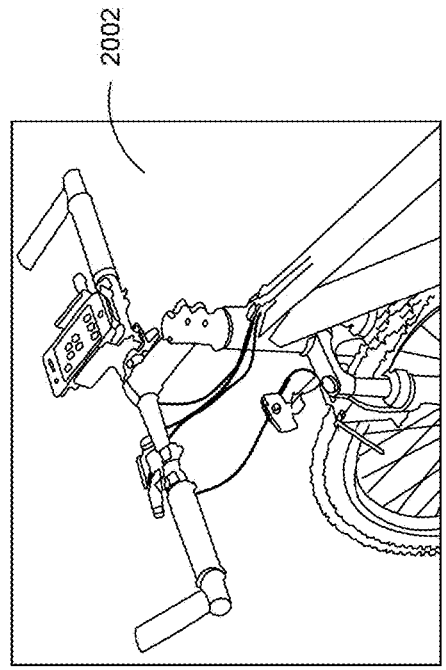
Figure 20:
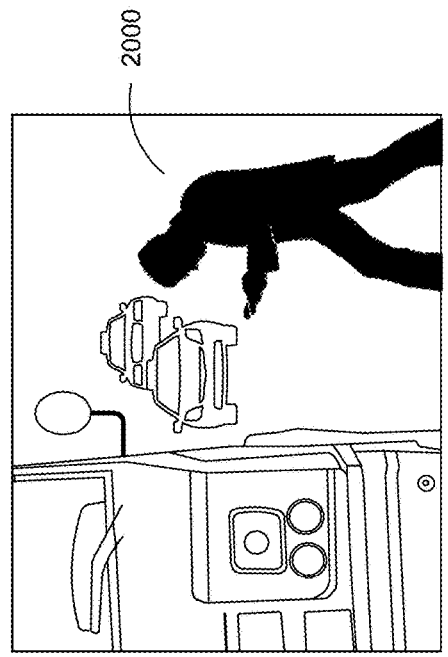

FIG. 20 is a schematic illustration of another example usage of an edge camera assembly according to disclosed embodiments. In this example, the edge camera assembly enables mobile device 102 to change field of view window 1504 based on an activity of user 100. For example, a mobile device mounted on a bicycle might require a field of view window that is different from a field of view of a user who is walking. In this embodiment, a method is provided for detecting the activity of the user and altering the windowed field of view based on that detected activity. Specifically, the edge camera assembly may be associated with a computer-readable medium configured for use in mobile device 102. The computer-readable medium contains instructions that when executed by processing device 1005 cause processing device 1005 to perform steps including: receiving from image sensor 210 image data representing an environment of user 100 as user 100 moves along travel path 1500; and receiving from at least one sensor information reflective of an activity in which user 100 is involved. The information reflective of the activity may include an indication of velocity, an indication of acceleration, and/or an indication of tilt angle of mobile device 102. The plurality of activities may include at least two of: walking 2000, bike riding 2002, car driving 2004, motorcycle riding 2006, and riding any other motored vehicle, such as, segway, scooter, hoverboard, and more. The steps of this embodiment further include: accessing in memory indicators of a plurality of activities and an associated field of view window is associated with each activity; selecting field of view window 1504 for real-time display on mobile device 102, wherein the selected field of view window is associated with the activity in which user 100 is currently involved; and applying the selected field of view window to the display of the mobile communications device. In one embodiment, selecting field of view window 1504 may involve executing image recognition algorithms to exclude from field of view window 1504 image data beyond boundaries associated with a path of user 100.

Figure 21:
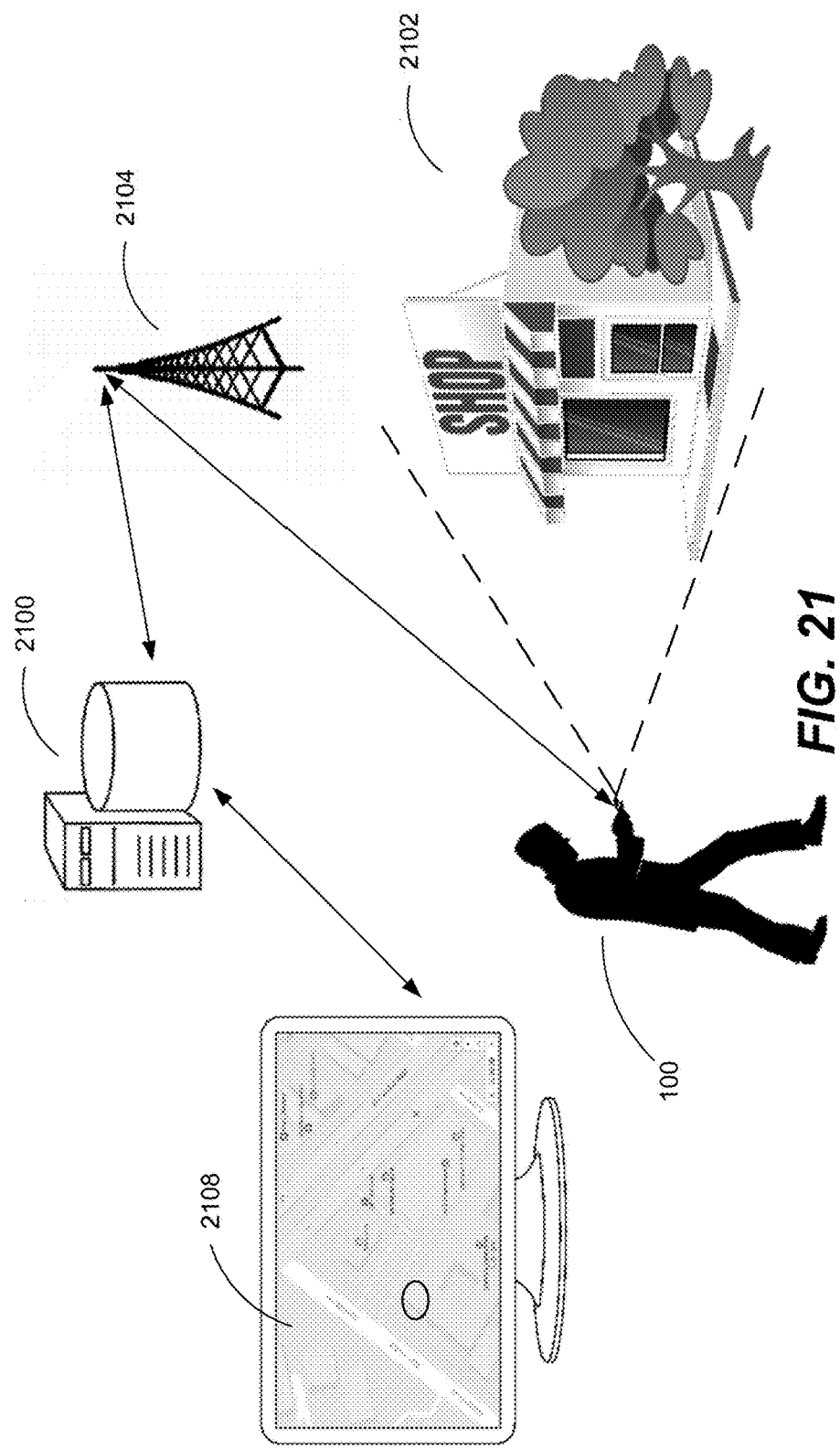
FIG. 21 is a schematic illustration of another example usage of an edge camera assembly according to disclosed embodiments; and, FIG. 22 is a schematic illustration of another example usage of an edge camera assembly according to disclosed embodiments.

FIG. 21 is a schematic illustration of another example usage of an edge camera assembly according to disclosed embodiments. Presently, online map services (e.g., Google maps street view) provide images that are long out of date. This is because companies that maintain online maps are able to capture street view images once every few months or years. However, a community of users constantly using mobile devices 102 with edge camera assemblies may constantly capture images of their surroundings. This information may be used to update online map services with street views much more regularly and/or to crowd-source a 3D scanning index of the environment of the community of users. In one example, a system for crowd-sourced generation of a street view map and/or a 3D scanning index using image data aggregated from a plurality of image sensors 210 embedded in edges of mobile device 102 is provided. The system comprises a processing device 1005 configured to maintain a street view map and/or a 3D scanning index of a geographical area, wherein GPS coordinates are associated with locations on the street view map and/or the 3D scanning index. Processing device 1005 is further configured to: receive from plurality of image sensors 210 embedded in edges of a plurality mobile devices 102 of a plurality of users 100, image data e.g., street view images that may be received in real-time or at a later time); and receive from each of plurality of mobile devices 102 a GPS location associated with the received image data. Thereafter, processing device 1005 may update the street view map and/or the 3D scanning index with received image data from the plurality of image sensors when GPS locations associated with received street view images correspond to GPS locations on the street view map and/or the 3D scanning index.

In related embodiments, processing device 1005 may receive the street view images from the plurality of mobile phones after the mobile devices 102 have altered the street view images to obscure personal information. For example, processing device 1005 may receive the street view images from plurality of mobile devices 102 without metadata information associated with plurality of users 100. Processing device 1005 may also request images of specific locations of interest and/or area of interest. In addition, processing device 1005 may receive a time stamp associated with each of the street view image and when multiple overlapping street view images are received from multiple users 100, to update the map with the latest street view image. Processing device 1005 may also unify multiple overlapping street view images that are received from multiple users 100, and update the map with a unified street view image. The following example is depicted in FIG. 21, illustrating one implementation of this embodiment. In this example, server 2100 may determine that the current street view image of shop 2102 in the database is not updated. Then server 2100 sends an indication to mobile device 102 requesting an updated image of shop 2102. Mobile device 102, using image sensor 210, may capture an image of shop 2102 without the user intervention and in one alternative even without the user knowledge. The street view image may be transferred to server 2100 via network 2104 and thereafter uploaded to the online map service 2108.

Figure 22:
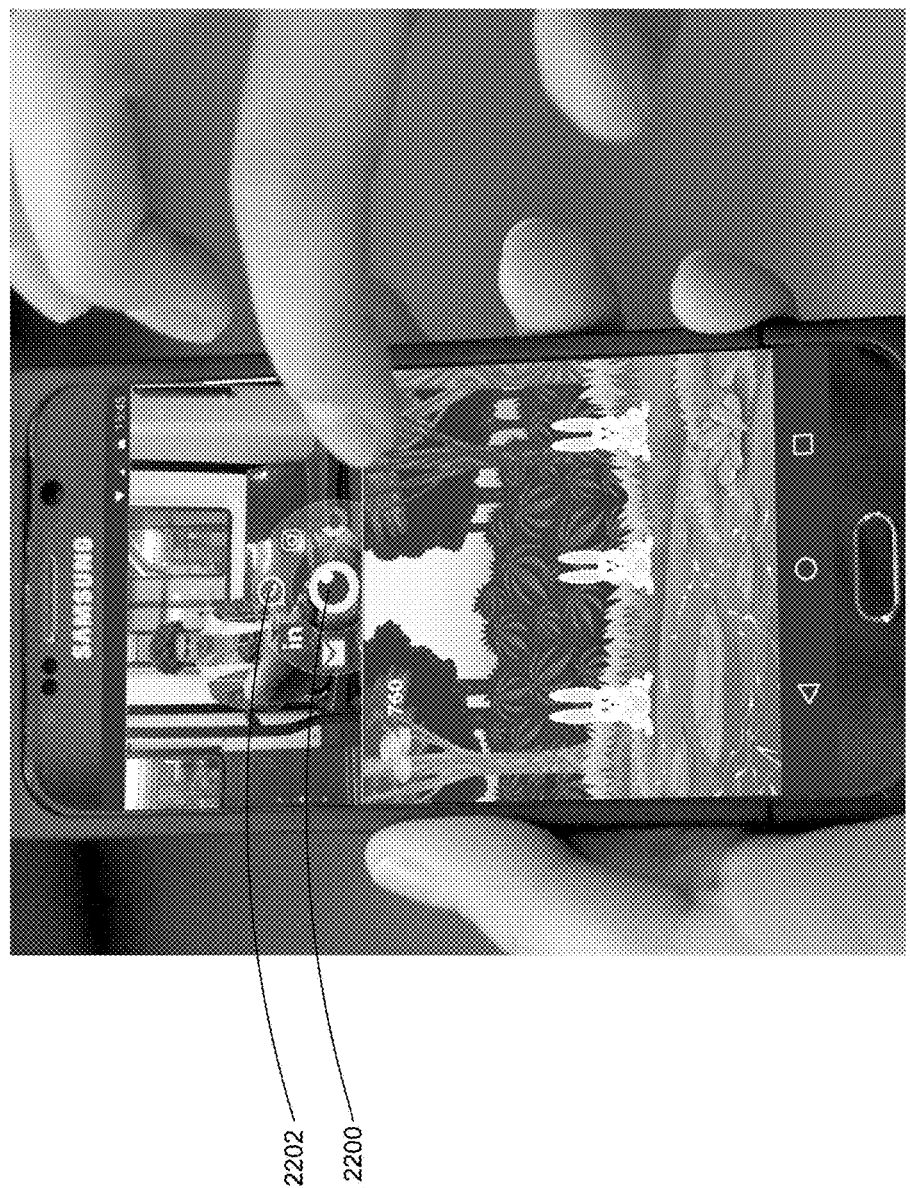

FIG. 22 is a schematic illustration of another example usage of an edge camera assembly according to disclosed embodiments. Consistent with the present the disclosure, a computer-implemented method is presented for providing a convenient way for user 100 to access interactive user applications that may interact with image data captured by image sensor 210. In one example, after user 100 presses GUI feature 2200 located in real-time image streaming window 304 a plurality of icons (e.g., icon 2202) associated with multiple interactive user applications may be presented in real-time image streaming window 304. User 100 may have the option to select which icons to display in real-time image streaming window 304. In one embodiment, after user 100 presses one of the icons associated with the multiple interactive user applications, the corresponding interactive user application may be opened in interactive user application window 306. One example of an interactive user application that interact with image data captured by image sensor 210 is described above with reference to FIG. 14.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An image capture casing for a handheld mobile communications device having an upward facing display surface and an opposing lower surface, the image capture casing comprising:
   a housing for surrounding at least a portion of the handheld mobile communications device;
   at least one image sensor mounted in the housing and having at least one optical axis configured to be oriented at a fixed obtuse angle with respect to the lower surface when the handheld mobile communications device is retained by the housing, wherein the at least one image sensor is oriented such that when the housing is held by a walking user at an acute angle with respect to a plane on which the user walks, the at least one optical axis generally faces in a walking direction of the user;
   an aperture configured to enable an optical axis of at least one additional image sensor of the handheld mobile communications device to pass therethrough, and wherein the at least one additional image sensor is distinct from the at least one image sensor mounted in the housing; and
   circuitry for conveying from the at least one image sensor mounted in the housing, image data for real-time display on the display surface.

2. The image capture casing of claim 1, wherein the image capture casing is integrated into the handheld mobile communications device and the handheld mobile communications device further includes the at least one additional image sensor mounted in the housing, wherein the at least one additional image sensor mounted in the housing includes a first additional image sensor having a first optical axis directed transverse to a plane of the display surface and a second additional image sensor embedded beneath the lower surface.

3. The image capture casing of claim 2, further comprising at least one processor configured to:
   receive, via the circuitry, image data from the at least one image sensor of the handheld mobile communications device, the first additional image sensor, and the second additional image sensor; and
   cause a simultaneous image presentation on the display surface from at least two of the at least one image sensor of the handheld mobile communications device, the first additional image sensor, and the second additional image sensor.

4. The image capture casing of claim 3, wherein the at least one optical axis of the at least one image sensor of the handheld mobile communications device is oriented at a fixed obtuse angle with respect to the first optical axis of the first additional image sensor and at a fixed acute angle with respect to a second optical axis of the second additional image sensor.

5. The image capture casing of claim 3, wherein a field of view of the at least one image sensor of the handheld mobile communications device partially overlaps with a field of view of the second additional image sensor.

6. The image capture casing of claim 5, wherein the at least one processor is further configured to stitch together image data from the at least one image sensor of the handheld mobile communications device and the second additional image sensor.

7. The image capture casing of claim 1, wherein the image capture casing is a removable case for the handheld mobile communications device such that the at least one optical axis of the at least one image sensor of the handheld mobile communications device is configured to be oriented at a fixed obtuse angle with respect to the lower surface when the handheld mobile communications device is retained by the housing, and the removable case includes a plurality of image sensors embedded in an edge interconnecting an upper side and a lower side of the housing.

8. The image capture casing of claim 7, wherein a combined field of view of the plurality of image sensors included in the removable case is greater than 180 degrees.

9. The image capture casing of claim 7, further comprising a connector in the housing configured to engage a port of the handheld mobile communications device when the handheld mobile communications device is seated in the removable case.

10. A handheld mobile communications device for presenting a real-time view of an environment in front of a user while the user interacts with displayed information, the handheld mobile communications device comprising:
a housing generally having a central axial plane;
a touch-sensitive display on a first side of the housing;
a back on a second side of the housing, opposite the first side;
a peripheral edge surface between the first side and the second side; and
at least one image sensor fixedly secured within the housing and having a fixed optical axis at a non-orthogonal angle relative to each of the first side of the housing, the second side of the housing, and the central axial plane, wherein the fixed optical axis of the at least one image sensor is tilted at an angle of between about 5° and about 80° relative to the central axial plane.

11. The handheld mobile communications device of claim 10, wherein the fixed optical axis of the at least one image sensor is tilted at an angle of between about 10° and about 70° relative to the central axial plane.

12. The handheld mobile communications device of claim 10, wherein a field of view of the at least one image sensor is greater than 60° degrees.

13. The handheld mobile communications device of claim 10, further comprising:
a first additional image sensor embedded in the housing and having a first additional optical axis extending in a first direction away from the first side;
a second additional image sensor embedded in the housing and having a second additional optical axis extending in a second direction away from the second side; and
wherein the optical axis of the at least one image sensor fixedly secured within the housing is oriented at a fixed obtuse angle with respect to the first additional optical axis and at a fixed acute angle with respect to the second additional optical axis.

14. The handheld mobile communications device of claim 13, wherein a field of view of the at least one image sensor fixedly secured within the housing partially overlaps with a field of view of the second additional image sensor.

15. The handheld mobile communications device of claim 14, further comprising at least one processor within the housing configured to stitch together image data from the at least one image sensor fixedly secured within the housing and the second additional image sensor.

16. The handheld mobile communications device of claim 13 further comprising at least one processor within the housing and configured to:
receive image data from the at least one image sensor fixedly secured within the housing, the first additional image sensor, and the second additional image sensor; and
enable presentation, on the touch-sensitive display, of at least a portion of the image data received from the at least one image sensor fixedly secured within the housing, the first additional image sensor, and the second additional image sensor.

17. The handheld mobile communications device of claim 16, wherein the at least one processor is further configured to:
simultaneously receive image data from at least two of the at least one image sensor fixedly secured within the housing, the first additional image sensor, and the second additional image sensor; and
cause a simultaneous image presentation on the touch-sensitive display from the at least two of said image sensors.

18. A removable case for a handheld mobile communications device having an upward facing display surface and an opposing lower surface, the case comprising:
a housing for surrounding at least a portion of the handheld mobile communications device;
a connector for making electrical connection with a port in the handheld mobile communications device when the handheld mobile communications device is seated in the housing;
at least one image sensor mounted in the housing and having at least one optical axis configured to be oriented at a fixed obtuse angle with respect to the lower surface when the handheld mobile communications device is retained by the housing, wherein the at least one image sensor is oriented such that when the housing is held by a walking user at an acute angle with respect to a plane on which the user walks, the at least one optical axis generally faces in a walking direction of the user and wherein a field of view of the at least one image sensor is greater than 180 degrees; and
circuitry for conveying from the at least one image sensor, image data for real-time display on the display surface.

19. The removable case of claim 18, further comprising:
at least one conduit embedded in the case extending between and electrically connecting the at least one image sensor with the connector to thereby enable real-time image streaming from the at least one image sensor to the handheld mobile communications device, wherein the at least one image sensor is embedded within a portion of an edge opposite the connector, and wherein the at least one conduit traverses the housing between the image sensor and the connector.

20. The removable case of claim 19, wherein the at least one image sensor includes a plurality of image sensors embedded in the edge.

21. The removable case of claim 18, wherein when the handheld mobile communications device is seated in the removable case, the optical axis of the at least one image sensor is fixedly tilted at an angle other than perpendicular to the display surface of the handheld mobile communications device.

22. The removable case of claim 18, wherein the at least one image sensor is embedded in the housing within a portion of an edge surface opposite the connector.

* * * * *